United States Patent
Matsuda et al.

(10) Patent No.: US 7,461,081 B2
(45) Date of Patent: Dec. 2, 2008

(54) INFORMATION-PROCESSING APPARATUS AND INFORMATION-PROCESSING METHOD

(75) Inventors: Toru Matsuda, Tokyo (JP); Sachiko Mihira, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 491 days.

(21) Appl. No.: 10/761,206

(22) Filed: Jan. 22, 2004

(65) Prior Publication Data

US 2004/0199538 A1   Oct. 7, 2004

(30) Foreign Application Priority Data

Jan. 23, 2003 (JP) ............... 2003-015346
Jan. 14, 2004 (JP) ............... 2004-006691

(51) Int. Cl.
*G06F 7/00* (2006.01)
*G06F 17/00* (2006.01)

(52) U.S. Cl. ............ 707/102; 707/104.1; 709/223

(58) Field of Classification Search .......... 707/1–3, 707/10, 104.1, 200–201
See application file for complete search history.

(56) References Cited

U.S. PATENT DOCUMENTS

| | | | | |
|---|---|---|---|---|
| 4,627,019 A * | 12/1986 | Ng | .............. | 707/8 |
| 4,860,214 A | 8/1989 | Matsuda et al. | | |
| 5,338,976 A | 8/1994 | Anwyl et al. | | |
| 6,490,624 B1 * | 12/2002 | Sampson et al. | .............. | 709/227 |
| 6,519,643 B1 * | 2/2003 | Foulkes et al. | .............. | 709/227 |
| 6,609,128 B1 * | 8/2003 | Underwood | .............. | 707/10 |
| 6,687,829 B1 | 2/2004 | Miyamoto et al. | | |
| 6,718,535 B1 * | 4/2004 | Underwood | .............. | 717/101 |
| 6,944,643 B1 * | 9/2005 | Ahmad et al. | .............. | 709/203 |
| 2002/0133573 A1 | 9/2002 | Matsuda et al. | | |
| 2003/0088677 A1 * | 5/2003 | Yamamoto | .............. | 709/227 |
| 2003/0130945 A1 * | 7/2003 | Force et al. | .............. | 705/40 |
| 2003/0200212 A1 * | 10/2003 | Benson et al. | .............. | 707/7 |
| 2004/0249921 A1 * | 12/2004 | Yamamoto | .............. | 709/223 |

FOREIGN PATENT DOCUMENTS

JP   7-64836   3/1995
JP   2001-155012   6/2001

OTHER PUBLICATIONS

U.S. Appl. No. 09/191,277, filed Nov. 12, 1998, Matsuda et al.

(Continued)

*Primary Examiner*—John Cottingham
*Assistant Examiner*—Susan F Rayyan
(74) *Attorney, Agent, or Firm*—Oblon, Spivak, McClelland, Maier & Neustadt, P.C.

(57) ABSTRACT

In an information-processing apparatus which provides one or more clients with a function that needs exclusive access control, a first management unit manages a series of first processing steps and incidental information in a state where a session with a client is maintained. A second management unit manages a series of indivisible second processing steps performed by using the function that needs exclusive access control. The first management unit starts the management of the first processing steps when a management start request is received from the client or when a request other than the management start request is received.

23 Claims, 13 Drawing Sheets

OTHER PUBLICATIONS

U.S. Appl. No. 10/372,798, filed Feb. 26, 2003, Matsuda.
U.S. Appl. No. 10/390,782, filed Mar. 19, 2003, Mihira.
U.S. Appl. No. 10/395,363, filed Mar. 25, 2003, Ito.
U.S. Appl. No. 10/453,686, filed Jun. 4, 2003, Mihira.
U.S. Appl. No. 10/665,536, filed Sep. 22, 2003, Motoyama.
U.S. Appl. No. 10/640,020, filed Aug. 14, 2003, Mihira et al.
U.S. Appl. No. 10/981,154, filed Jul. 15, 2004, Mihira et al.
U.S. Appl. No. 10/936,585, filed Sep. 9, 2004, Araumi et al.
U.S. Appl. No. 10/696,064, filed Oct. 21, 2004, Mihira et al.
U.S. Appl. No. 10/980,731, filed Nov. 4, 2004, Ito et al.
U.S. Appl. No. 10/981,619, filed Nov. 5, 2004, Ito et al.
U.S. Appl. No. 11/154,659, filed Jun. 17, 2005, Yagiura et al.
U.S. Appl. No. 11/211,456, filed Aug. 26, 2005, Takeuchi et al.
U.S. Appl. No. 11/231,900, filed Sep. 22, 2005, Matsuda et al.
U.S. Appl. No. 11/240,511, filed Oct. 3, 2005, Takeuchi et al.
U.S. Appl. No. 11/251,886, filed Oct. 18, 2005, Takeuchi et al.

* cited by examiner

INFORMATION-PROCESSING APPARATUS AND INFORMATION-PROCESSING METHOD

BACKGROUND OF THE INVENTION

1. Field of the Invention

The present invention generally relates to an information-processing apparatus and method, and more particularly to an information-processing apparatus and method which provides a client with a function that needs exclusive access control.

2. Description of the Related Art

In recent years, in a system in which a plurality of clients and an information-processing apparatus are connected together via a network, the functions of the information-processing apparatus are often shared among the plurality of clients. When a function request for using a certain function of the apparatus is received from a particular client, the apparatus starts the transaction according to the function request, and allows the particular client to use that function.

The transaction herein is a processing range or processing unit having a significant meaning, and it means a series of indivisible processing steps that needs exclusive access control in which the exclusion of the intervention from other clients etc. is carried out.

With respect to this, there are various examples of the intervention, including the setting change request, the updating request of shared information, and the acquisition request of shared information, which are sent from other clients, and the setting change request, the power down request, the power-saving mode shift request, and the reboot request, which are inputted from the operation panel of the information-processing apparatus.

For example, when an updating request of 200-page document data is received from the user, a series of processing steps to perform the updating or writing of the 200-page document data to the shared information is called the transaction. In addition, even in a case when an updating request of 200-page document data is received from the user and the information-processing apparatus carries out the updating or writing of the document data to the shared information one page at a time, a series of processing steps to perform the updating or writing of the 200-page document data to the shared information is the transaction.

The information-processing apparatus generally finishes the transaction by the time-out when a predetermined time-out period has elapsed after the last function request was received from the client.

Japanese Laid-Open Patent Application No. 7-064836 discloses a computer system in which the user explicitly notifies to the server the start/end of the transaction.

Moreover, Japanese Laid-Open Patent Application No. 2001-155012 discloses a computer system in which the functions within the network are shared.

In the conventional information-processing apparatus, if a function request from a client is received again after the transaction is started, the transaction is extended. However, the conventional information-processing apparatus is not provided to manage the transactions in accordance with the function requests received from the respective clients. Hence, every time the function request from any client is received again since the transaction is started, the transaction is extended.

For this reason, the conventional information-processing apparatus takes a relatively long time to finish the transaction by the time-out, and has the difficulty in managing the transaction efficiently.

Moreover, the conventional information-processing apparatus continues to reject the intervention by other clients until the transaction is finished by the time-out, and has the problem that it is difficult to quickly handle the intervention of the power down request etc. from other clients.

Furthermore, since the conventional information-processing apparatus is not provided to manage the transactions in accordance with the function requests received from the respective clients, there is the problem that the client is unable to control the transaction so as to be ended before the time-out period expires.

SUMMARY OF THE INVENTION

An object of the present invention is to provide an improved information-processing apparatus and method in which the above-described problems are eliminated.

Another object of the present invention is to provide an information-processing apparatus and method which can efficiently manage the function that needs exclusive access control, and can quickly provide the client with the function.

The above-mentioned objects of the present invention are achieved by an information-processing apparatus including a module which provides one or more clients with a function that needs exclusive access control, the apparatus comprising: a first management unit managing a series of first processing steps and incidental information in a state where a session with a client is maintained; and a second management unit managing a series of indivisible second processing steps performed by using the function that needs exclusive access control, wherein the first management unit starts the management of the first processing steps when a management start request is received from the client or when a request other than the management start request is received.

The above-mentioned objects of the present invention are achieved by an information-processing apparatus including a module which provides one or more clients with a function that needs exclusive access control, the apparatus comprising: a first management unit managing a series of first processing steps and incidental information in a state where a session with a client is maintained; and a second management unit managing a series of indivisible second processing steps performed by using the function that needs exclusive access control, wherein the first management unit starts the management of the first processing steps when a management start request and a request other than the management start request are received from the client.

The above-mentioned objects of the present invention are achieved by an information-processing apparatus including a module which provides one or more clients with a function that needs exclusive access control, the apparatus comprising: a first management unit managing a series of first processing steps and incidental information in a state where a session with a client is maintained; and a second management unit managing a series of indivisible second processing steps performed by using the function that needs exclusive access control, wherein the first management unit ends the management of the first processing steps when a management end request is received from the client or when a predetermined time-out period expires.

The above-mentioned objects of the present invention are achieved by an information-processing apparatus including a module which provides one or more clients with a function that needs exclusive access control, the apparatus comprising: a first management unit managing a series of first processing steps and incidental information in a state where a session with a client is maintained; and a second management unit managing a series of indivisible second processing steps performed by using the function that needs exclusive access control, wherein the first management unit ends the management of the first processing steps when a management end request is received from the client and a predetermined time-out period expires.

The above-mentioned objects of the present invention are achieved by an information-processing apparatus including a module which provides one or more clients with a function that needs exclusive access control, the apparatus comprising: a first management unit managing a series of first processing steps and incidental information in a state where a session with a client is maintained; and a second management unit managing a series of indivisible second processing steps performed by using the function that needs exclusive access control, wherein the second management unit starts the management of the second processing steps when a management start request is received from the client or when a request other than the management start request is received.

The above-mentioned objects of the present invention are achieved by an information-processing apparatus including a module which provides one or more clients with a function that needs exclusive access control, the apparatus comprising: a first management unit managing a series of first processing steps and incidental information in a state where a session with a client is maintained; and a second management unit managing a series of indivisible second processing steps performed by using the function that needs exclusive access control, wherein the second management unit starts the management of the second processing steps when a management start request and a request other than the management start request are received from the client.

The above-mentioned objects of the present invention are achieved by an information-processing apparatus including a module which provides one or more clients with a function that needs exclusive access control, the apparatus comprising: a first management unit managing a series of first processing steps and incidental information in a state where a session with a client is maintained; and a second management unit managing a series of indivisible second processing steps performed by using the function that needs exclusive access control, wherein the second management unit ends the management of the second processing steps when a management end request is received from the client or when a predetermined time-out period expires.

The above-mentioned objects of the present invention are achieved by an information-processing apparatus including a module which provides one or more clients with a function that needs exclusive access control, the apparatus comprising: a first management unit managing a series of first processing steps and incidental information in a state where a session with a client is maintained; and a second management unit managing a series of indivisible second processing steps performed by using the function that needs exclusive access control, wherein the second management unit ends the management of the second processing steps when a management end request is received from the client and a predetermined time-out period expires.

The above-mentioned objects of the present invention are achieved by an information-processing method for an information-processing apparatus which provides one or more clients with a function that needs exclusive access control, the method comprising: a first management step of managing a series of first processing steps and incidental information in a state where a session with a client is maintained; and a second management step of managing a series of indivisible second processing steps performed by using the function that needs exclusive access control, wherein the first management step starts the management of the first processing steps when a management start request is received from the client or when a request other than the management start request is received.

The above-mentioned objects of the present invention are achieved by an information-processing method for an information-processing apparatus which provides one or more clients with a function that needs exclusive access control, the method comprising: a first management step of managing a series of first processing steps and incidental information in a state where a session with a client is maintained; and a second management step of managing a series of indivisible second processing steps performed by using the function that needs exclusive access control, wherein the first management step starts the management of the first processing steps when a management start request and a request other than the management start request are received from the client.

The above-mentioned objects of the present invention are achieved by an information-processing method for an information-processing apparatus which provides one or more clients with a function that needs exclusive access control, the method comprising: a first management step of managing a series of first processing steps and incidental information in a state where a session with a client is maintained; and a second management step of managing a series of indivisible second processing steps performed by using the function that needs exclusive access control, wherein the first management step ends the management of the first processing steps when a management end request is received from the client or when a predetermined time-out period expires.

The above-mentioned objects of the present invention are achieved by an information-processing method for an information-processing apparatus which provides one or more clients with a function that needs exclusive access control, the method comprising: a first management step of managing a series of first processing steps and incidental information in a state where a session with a client is maintained; and a second management step of managing a series of indivisible second processing steps performed by using the function that needs exclusive access control, wherein the first management step ends the management of the first processing steps when a management end request is received from the client and a predetermined time-out period expires.

The above-mentioned objects of the present invention are achieved by an information-processing method for an information-processing apparatus which provides one or more clients with a function that needs exclusive access control, the method comprising: a first management step of managing a series of first processing steps and incidental information in a state where a session with a client is maintained; and a second management step of managing a series of indivisible second processing steps performed by using the function that needs exclusive access control, wherein the second management step starts the management of the second processing steps when a management start request is received from the client or when a request other than the management start request is received.

The above-mentioned objects of the present invention are achieved by an information-processing method for an information-processing apparatus which provides one or more clients with a function that needs exclusive access control, the method comprising: a first management step of managing a series of first processing steps and incidental information in a state where a session with a client is maintained; and a second management step of managing a series of indivisible second processing steps performed by using the function that needs exclusive access control, wherein the second management step starts the management of the second processing steps when a management start request and a request other than the management start request are received from the client.

The above-mentioned objects of the present invention are achieved by an information-processing method for an information-processing apparatus which provides one or more clients with a function that needs exclusive access control, the method comprising: a first management step of managing a series of first processing steps and incidental information in a state where a session with a client is maintained; and a second management step of managing a series of indivisible second processing steps performed by using the function that needs exclusive access control, wherein the second management step ends the management of the second processing steps when a management end request is received from the client or when a predetermined time-out period expires.

The above-mentioned objects of the present invention are achieved by an information-processing method for an information-processing apparatus which provides one or more clients with a function that needs exclusive access control, the method comprising: a first management step of managing a series of first processing steps and incidental information in a state where a session with a client is maintained; and a second management step of managing a series of indivisible second processing steps performed by using the function that needs exclusive access control, wherein the second management step ends the management of the second processing steps when a management end request is received from the client and a predetermined time-out period expires.

In the information-processing apparatus and method of the present invention, the management of the first processing steps and the management of the second processing steps can be initiated or terminated in response to an explicit or implicit processing request. Therefore, according to the information-processing apparatus and method of the present invention, it is possible to efficiently manage the function that needs exclusive access control, and it is possible to quickly provide the client with the function.

BRIEF DESCRIPTION OF THE DRAWINGS

Other objects, features and advantages of the present invention will be apparent from the following detailed description when read in conjunction with the accompanying drawings.

DETAILED DESCRIPTION OF PREFERRED EMBODIMENTS

A description will now be provided of the preferred embodiments of the present invention with reference to the accompanying drawings.

Although the following description is focused on processing of an image forming apparatus as an example of the information-processing apparatus of the invention, it should be noted that the present invention is not limited to the processing of the image forming apparatus and it is applicable to an information-processing apparatus which provides a function that needs exclusive access control.

In addition, the image forming apparatus in this embodiment is provided with the respective functions of image forming modules, such as the printer, the copier, the facsimile, and the scanner, which are contained in one housing of the apparatus, and this image forming apparatus will be called the multi-function peripheral system (MFP).

The multi-function peripheral system (MFP) includes the display unit, the printing unit, the image reading unit, etc. in a single housing, and is provided with the four kinds of software (application programs) corresponding to the printer, the copier, the facsimile, and the scanner, respectively. By selecting one of these applications, and the MFP is operated as the selected one of the printer, the copier, the facsimile, and the scanner.

Figure 1:
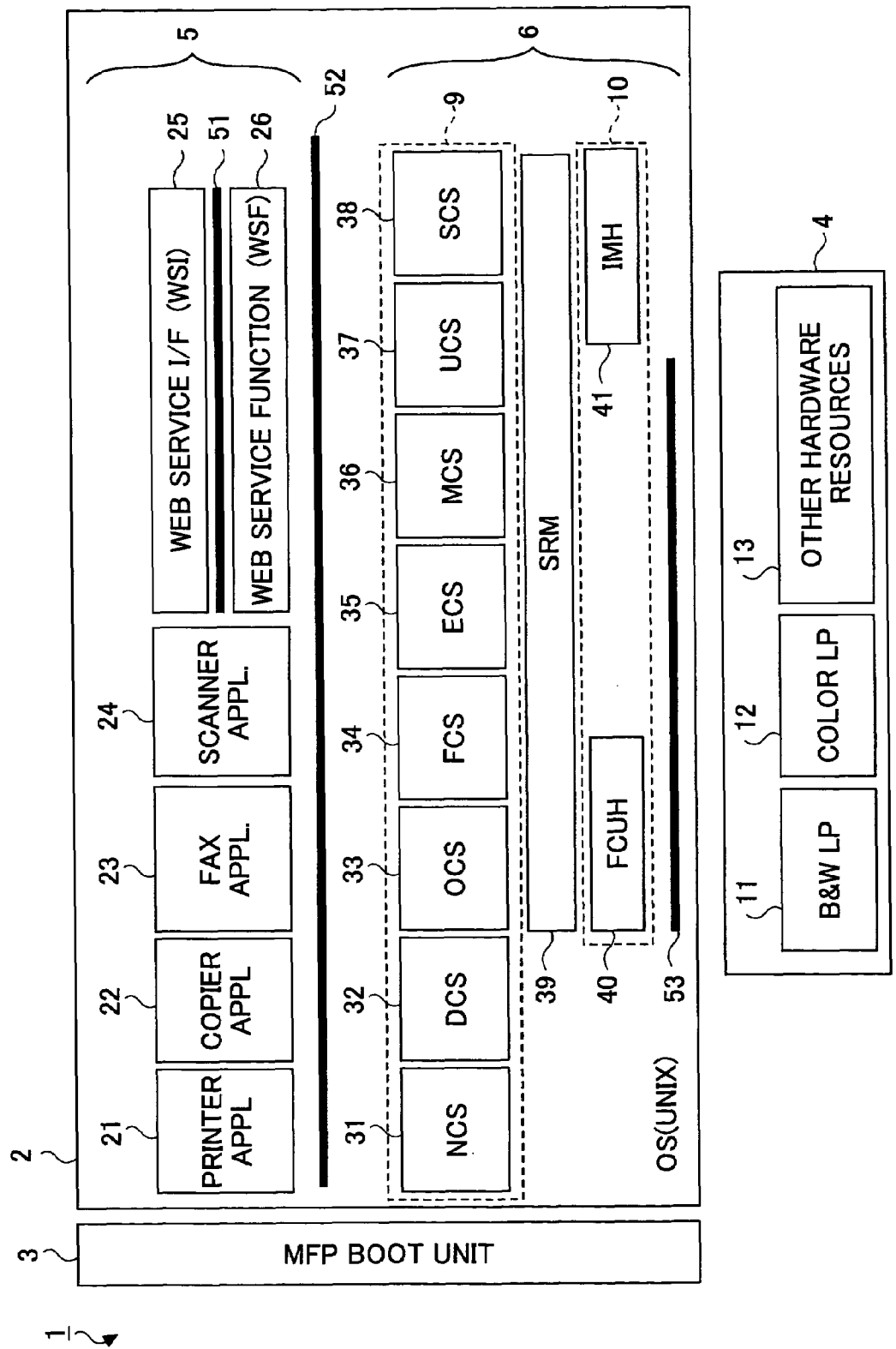
FIG. 1 is a block diagram of an embodiment of the multi-function peripheral system according to the invention.

FIG. 1 is a block diagram of one embodiment of the multi-function peripheral system according to the invention.

As shown in FIG. 1, the multi-function peripheral system (MFP) 1 is constituted so that the software group 2, the MFP boot unit 3, and hardware resources 4 are included.

The MFP boot unit 3 is activated by the power up of the multi-function peripheral system 1, and starts execution of the application layer 5 and the platform 6 in the software group 2.

For example, the MFP boot unit 3 reads the programs of the application layer 5 and the platform 6 from the hard disk drive (HDD) etc., transfers each read program to the memory storage, and starts the execution thereof.

The hardware resources 4 include the monochrome laser beam printer (B&W LP) 11, the color laser printer (Color LP) 12, and other hardware resources 13, such as the scanner and the facsimile.

The software group 2 includes the application layer 5 and the platform 6 which are operated on the operating system (OS), such as UNIX (registered trademark).

The application layer 5 includes the programs which perform processing specific to the respective user services related to the image formation, such as the printer, the copier, the facsimile, and the scanner. Specifically, the application layer 5 includes the printer application 21, the copier application 22, the fax application 23, the scanner application 24, the Web service interface (WSI) 25, and the Web service function (WSF) 26.

In addition, WSF 26 is constituted with the pre-defined functions so that the application program interface (API) 51 which receives a processing request from WSI 25 is included.

The platform 6 includes the control service layer 9, the system resource manager (SRM) 39, and the handler layer 10. The control service layer 9 interprets the processing request from the application layer 5, and generates the acquisition request to the hardware resources 4. The SRM 39 manages one or more hardware resources 4, and arbitrates the acquisition request from the control service layer 9. The handler layer 10 manages the hardware resources 4 according to the acquisition request from SRM 39.

The control service layer 9 is constituted to include one or more service modules therein. Specifically, the control service layer 9 includes the network control service (NCS) 31, the delivery control service (DCS) 32, the operation panel control service (OCS) 33, the facsimile control service (FCS) 34, the engine control service (ECS) 35, the memory control service (MCS) 36, the user information control service (UCS) 37, and the system control service (SCS) 38.

In addition, the platform 6 is constituted with the pre-defined functions so that the application program interface (API) 52 which receives a processing request from the application layer 5 is included. The operating system (OS) carries out parallel execution of the applications of the application layer 5 and the platform 6 as processes thereon.

The process of NCS 31 acts as the agent that distributes the data received from the network through the corresponding protocol over the applications, and transmits the data from the applications to the network through the corresponding protocol. For example, the process of NCS 31 controls data communications of HTTP (hypertext transfer protocol) between the MFP and the clients connected via the network, by using HTTPD (hypertext transfer protocol daemon).

The process of DCS 32 controls delivery of the accumulated documents etc. The process of OCS 33 controls operation of the operation panel. The process of FCS 34 provides the application program interface for performing the facsimile transmission and reception using the PSTN or ISDN network from the application layer 5, the registration/retrieval of various facsimile data managed with the backup memory, the facsimile reading, the facsimile reception and printing, etc.

The process of ECS 35 controls the engine units, such as the monochrome laser beam printer 11, the color laser printer 12, and the other hardware resources 13. The process of MCS 36 performs memory control of the memory acquisition and releasing, the use of HDD, the compression and expansion of image data, etc. The process of UCS 37 manages user information. The process of SCS 38 controls the application management, the operation panel control, the system monitor displaying, the LED monitor displaying, the hardware-resources management, the interrupted application control, etc.

The process of SRM 39 carries out the system control and the management of the hardware resources 4 associated with SCS 38. For example, the process of SRM 39 arbitrates the acquisition requests from the upper layer to use the hardware resources 4, such as the monochrome laser beam printer 11 and the color laser printer 12, and controls the execution thereof.

Specifically, the process of SRM 39 determines whether the hardware resources 4 can be used according to the acquisition request (or whether they are currently used according to another acquisition request). If the use of the hardware resources 4 is possible, the process of SRM 39 notifies the upper layer that the hardware resources 4 can be used according to the acquisition request.

Moreover, the process of SRM 39 performs scheduling of the use of the hardware resources 4 according to the acquisition request from the upper layer, and carries out the contents of the request (for example, the paper conveyance and the imaging operation by means of the printer engine, the memory reservation, the file generation, etc.) directly.

Moreover, the handler layer 10 includes the facsimile control unit handler (FCUH) 40 which manages the facsimile control unit (FCU), and the image memory handler (IMH) 41 which carries out the memory assignment of the process and the management of the memory assigned to the process.

SRM 39, FCUH 40, and IMH 41 perform the processing request to the hardware resources 4 by using the engine interface 53 which transmits the processing request to the hardware resources 4 with the pre-defined functions.

With the above-described composition of FIG. 1, the multi-function peripheral system 1 can carry out the intensive control of each processing commonly required by the respective applications on the platform 6.

Next, a description will be given of the hardware configuration of the multi-function peripheral system 1 according to the invention.

Figure 2:
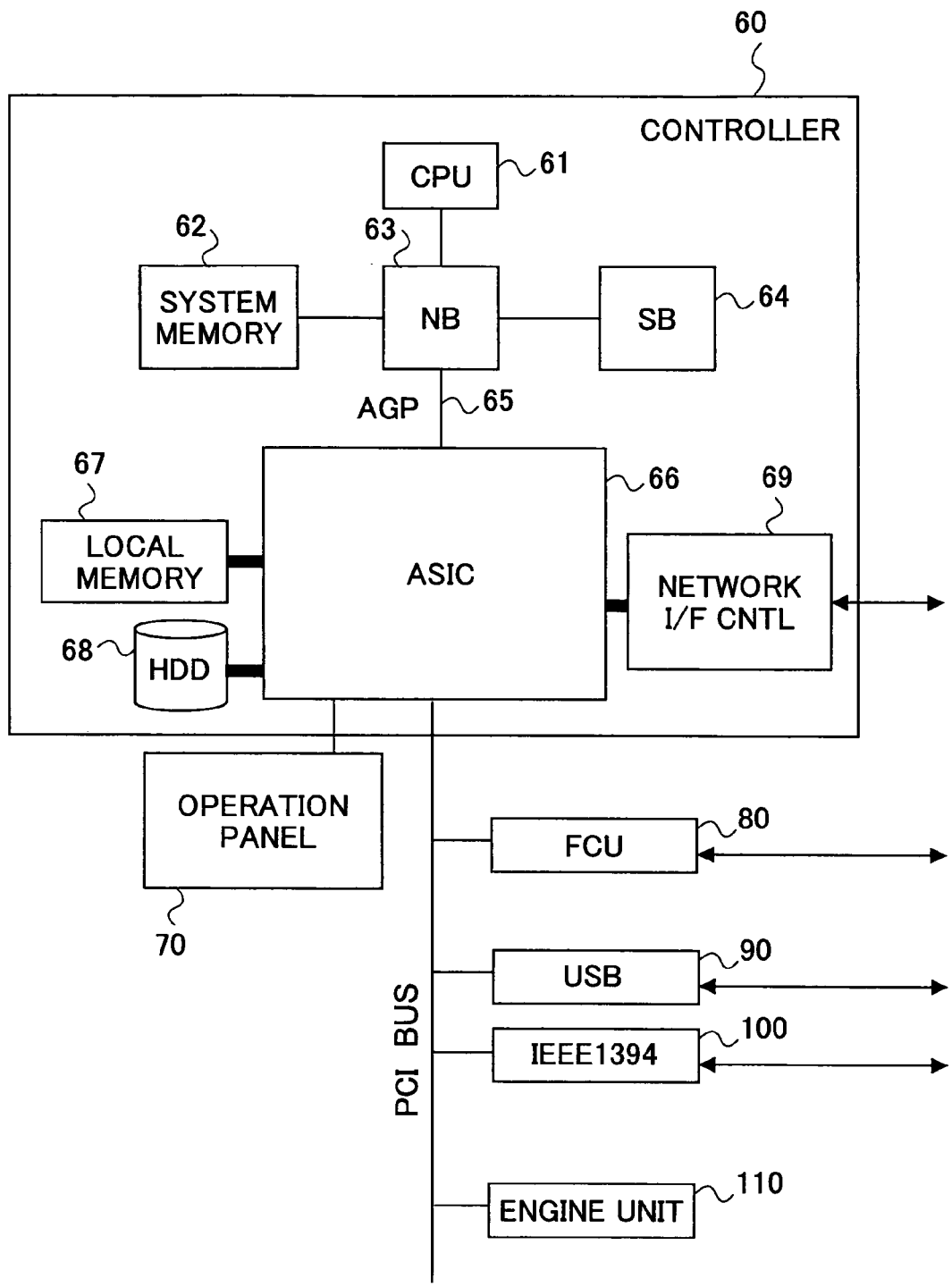
FIG. 2 is a block diagram of a hardware configuration of the multi-function peripheral system according to the invention.

FIG. 2 shows the hardware configuration of the multi-function peripheral system 1 according to the invention.

As shown in FIG. 2, the multi-function peripheral system 1 includes the controller 60, the operation panel 70, the facsimile control unit (FCU) 80, the universal-serial-bus device (USB) 90, the IEEE1394 device 100, and the engine unit 110.

The controller 60 includes the CPU 61, the system memory 62, the north bridge (NB) 63, the south bridge (SB) 64, the application-specific integrated circuit (ASIC) 66, the local memory (LM) 67, and the hard disk drive (HDD) 68, and the network interface controller (I/F CNTL) 69.

The operation panel 70 is connected to ASIC 66 of the controller 60. Moreover, the FCU 80, the USB device 90, the IEEE1394 device 100, and the engine section 110 are connected to ASIC 66 of the controller 60 by the PCI (peripheral component interconnect) bus.

In the controller 60, LM 67, HDD 68, and the network I/F controller 69, etc. are connected to ASIC 66, while CPU 61 and ASIC 66 are connected together via NB 63 of the CPU chipset. Even if the interface of CPU 61 is not open to the public, the connection of CPU 61 and ASIC 66 via NB 63 of the CPU chipset will eliminate the problem.

In addition, the connection of ASIC 66 and NB 63 is established through the accelerated graphics port (AGP) 65, not the PCI bus. In order to carry out execution of one or more processes which are formed by the application programs of the application layer 5 and the platform 6 of FIG. 1, the connection of ASIC 66 and NB 63 through the AGP 65 will prevent the deterioration of performance due to low-speed data transmission caused by the PCI bus connection.

CPU 61 performs the control of the whole multi-function peripheral system 1. CPU 61 starts execution of NCS 31, DCS 32, OCS 33, FCS 34, ECS 35, MCS 36, UCS 37, SCS 38, SRM 39, FCUH 40, and IMH 41, and performs each process of the programs on the OS. Moreover, CPU 61 starts execution of the printer application 21, the copier application 22, the facsimile application 23, the scanner application 24, WSI 25, and WSF 26, which constitute the application layer 5, and performs each process of the programs on the OS.

NB 63 is the bridge which is provided for interconnection of CPU 61, the system memory 62, SB 64, and ASIC 66. The system memory 62 is the memory which is used for image drawing of the multi-function peripheral system 1. SB 64 is the bridge which is provided for interconnection of NB 63, ROM (not shown), the PCI bus, and the peripheral devices.

The local memory 67 is the memory which is used as the image buffer for copying documents or the buffer for encoding images. ASIC 66 is the application-specific integrated circuit for image processing uses including the hardware for image processing. HDD 68 is the storage device for accumulating images, document data, programs, font data, forms, etc. The operation panel 70 is provided to display the operational messages to the user and receive the input operational commands from the user.

Next, a description will be given of the information-processing method performed by the multi-function peripheral system 1, with reference to the accompanying drawings.

Figure 3:
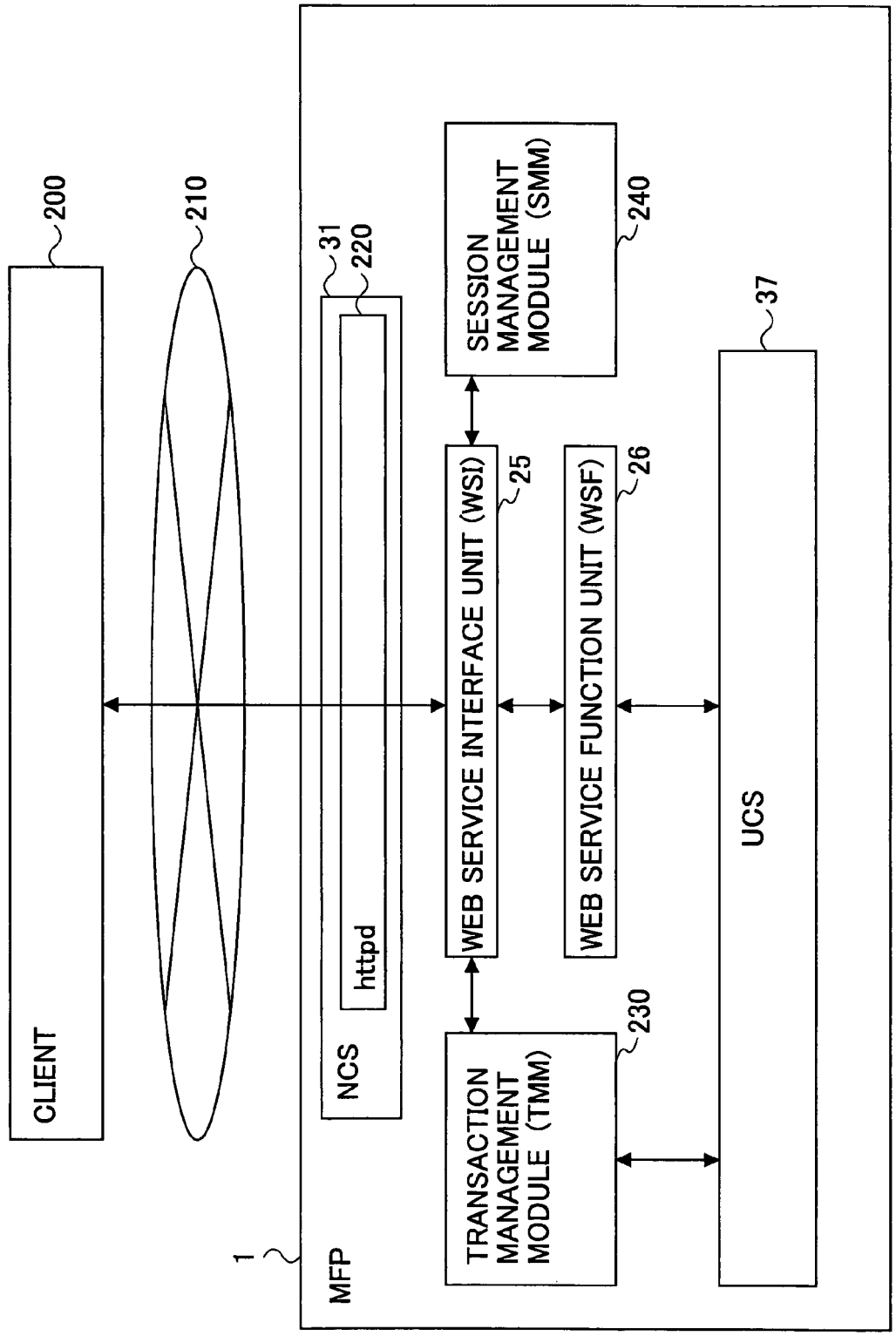
FIG. 3 is a block diagram of a system configuration of the information-processing apparatus of the invention.

FIG. 3 shows a system configuration of the information-processing apparatus according to the invention. In FIG. 3, the configuration which is unnecessary for the description of the present invention will be omitted appropriately.

In the system configuration of FIG. 3, the client 200 is connected to the multi-function peripheral system 1 through the network 210, such as the Internet or LAN.

The client 200 and the multi-function peripheral system (MFP) 1 perform a data communication over the network using an XML (extensible markup language)-based protocol.

In this embodiment, the client 200 and the MFP 1 use the communication protocol called SOAP (simple object access protocol), as the data access protocol. The client 200 creates an XML-based SOAP message, stores the created SOAP message into the HTTP message, and transmits the HTTP message to the MFP 1 over the network 210.

In the MFP 1, the HTTP message received from the client 200 is sent to the Web service interface unit (WSI) 25 through HTTPD 220 of NCS 31. When the HTTP message is received, WSI 25 interprets the SOAP message from the received HTTP message, and using the dispatcher, WSI 25 requests a processing to the Web service function unit (WSF) 26, the transaction management module (TMM) 230, or the session management module (SMM) 240 according to the interpreted contents.

For example, WSF 26 transmits the function request of user information to UCS 37. Moreover, TMM 230 transmits the lock request or the unlock request of user information to UCS 37. In this embodiment, TMM 230 and SMM 240 are provided in the control service layer 9.

UCS 37 carries out the intensive management of user information as an example of the shared data. For example, UCS 37 stores the user information into HDD 68, and manages the user information stored in HDD 68. UCS 37 performs the shared lock (read lock request) or the exclusive lock (write lock request) to the user information when the lock request is received.

The shared lock performed by USC 37 serves to inhibit other clients than the client 200 from rewriting of user information before USC 37 performs the function request to user information. In addition, the unlock request corresponding to the shared lock serves to cancel the inhibition of the rewriting of user information.

The exclusive lock performed by USC 37 serves to inhibit other clients than the client 200 from reading and rewriting of user information before USC 37 performs the function request to user information. In addition, the unlock request corresponding to the exclusive lock serves to cancel the inhibition of the reading and rewriting of user information.

In addition, although the transaction management module (TMM) 230 of FIG. 3 receives the processing request from WSI 25, TMM 230 may be provided to receive the processing request from WSF 26. Moreover, TMM 230 may be configured to include the configuration of WSI 25 or WSF 26.

Although the session management module (SMM) 240 of FIG. 3 receives the processing request from WSI 25, SMM 240 may be provided to receive the processing request from WSF 26. Moreover, SMM 240 may be configured to include the configuration of the WSI 25 or WSF 26.

Furthermore, the configuration of at least one of TMM 230 and SMM 240 may be provided outside the multi-function peripheral system 1.

When TMM 230 and SMM 240 are provided outside the WSI 25 or WSF 26, it is possible to provide the configuration which carries out the transaction management and the session management having the common specifications to a plurality of Web services.

Moreover, TMM 230 may be configured to include SMM 240, or conversely SMM 240 may be configured to include TMM 230.

Next, a description will be provided of the first preferred embodiment of the information-processing method of the invention.

Figure 4:
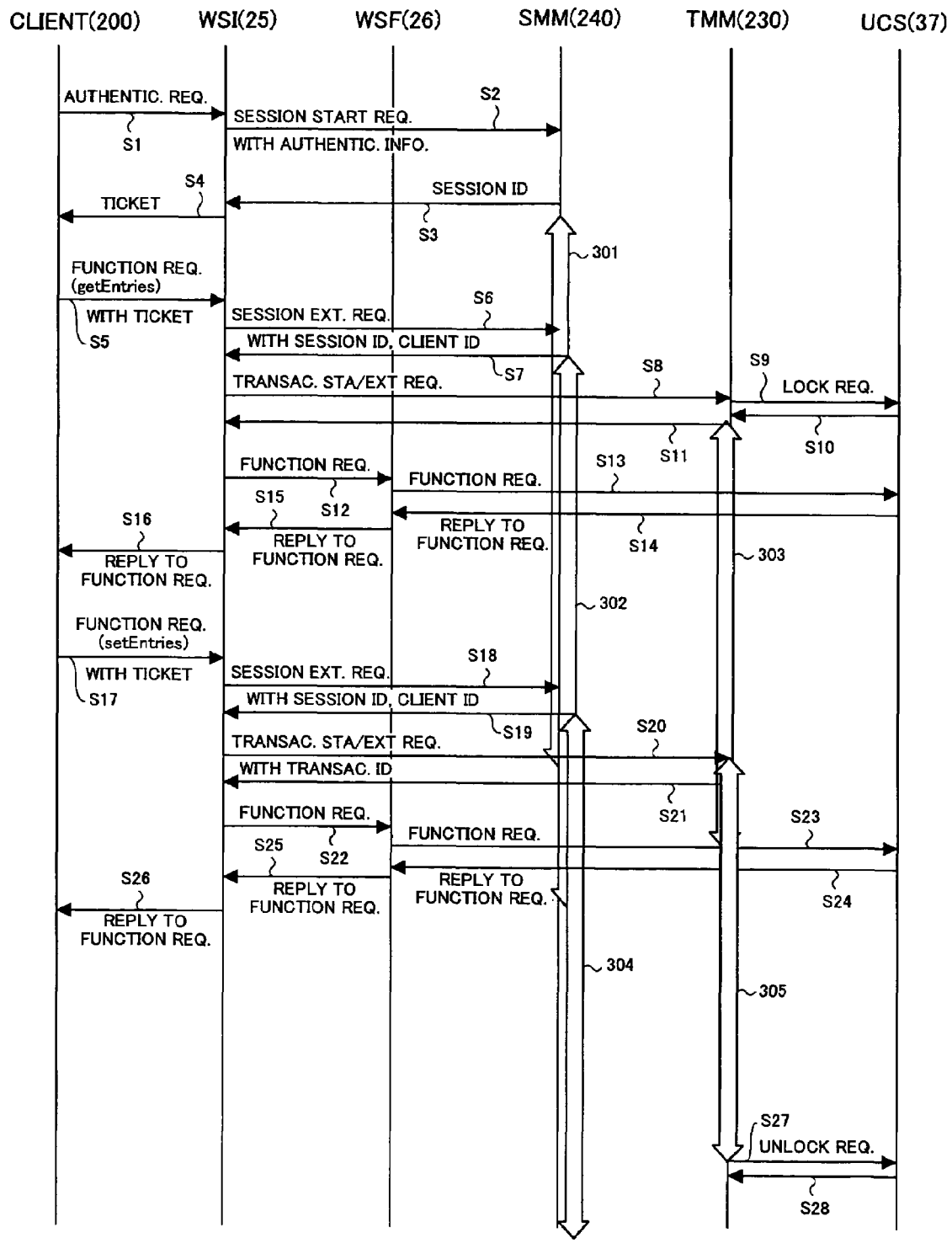
FIG. 4 is a sequence diagram for explaining a first preferred embodiment of the information-processing method of the invention.

The system of FIG. 3 performs the processing shown in the sequence diagram of FIG. 4. FIG. 4 shows the first preferred embodiment of the information-processing method of the invention.

At step S1, the client 200 transmits a part or all of the information required for user authentication to the multi-function peripheral system 1, and transmits the authentication request (for example, authenticate).

WSI 25 of the multi-function peripheral system 1 receives a part or all of the information required for user authentication through HTTPD 220 of NCS 31.

Progressing to step S2 following step S1, WSI 25 transmits a part or all of the information required for user authentication to SMM 240, and sends the session start request.

Figure 5:
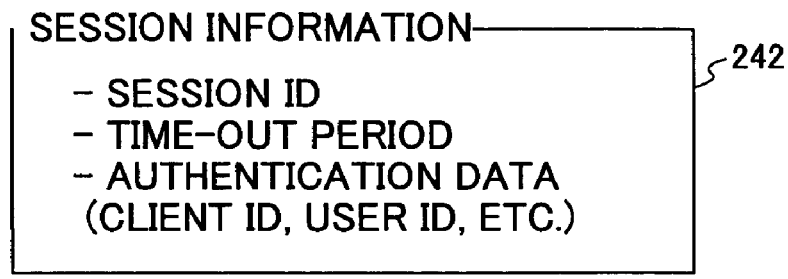
FIG. 5 is a diagram showing an example of session information.

If a part or all of the information required for user authentication is received, SMM 240 will create session information as shown in FIG. 5, and will start the session.

In addition, the arrow 301 in FIG. 4 indicates the time-out period for which SMM 240 holds the session information.

FIG. 5 shows an example of session information.

As shown in FIG. 5, the session information 242 includes the incidental information, such as session ID, time-out period, and authentication information. In addition, the time-out period is the term of validity of the session. The authentication information is the sender identification information, such as client ID and user ID.

Progressing to step S3 following step S2, SMM 240 transmits the session ID contained in the created session information to WSI 25.

WSI 25 will generate the ticket according to the session ID, if the session ID is received.

Progressing to step S4 following step S3, WSI 25 transmits the ticket to the client 200 as an authentication request response.

Steps S1-S4 are an example of the processing which implicitly starts the session in response to the authentication request received from the client 200. In addition, the implicit starting or ending of the session means that starting or ending of the session is performed with any request, other than the session start request, used as the trigger.

At step S5, the client 200 transmits the ticket to the multi-function peripheral system 1, and sends the function request (for example, getEntries). WSI 25 receives the ticket through HTTPD 220 of NCS 31.

Progressing to step S6 following step S5, WSI 25 acquires the session ID and client ID according to the ticket, and transmits the session ID and client ID to SMM 240, so that the session extension request is performed.

If the session ID and client ID are received, SMM 240 will extend the time-out period contained in session information as shown in FIG. 5, and will extend the session.

In addition, the arrow 302 in FIG. 4 indicates the time-out period for which SMM 240 holds the session information. Thus, SMM 240 changes the time-out period for which the session information is held, to the period indicated by the arrow 302 from the period indicated by the arrow 301 based on the function request received from the client 200.

After SMM 240 extends the session, it progresses to step S7 following step S6, and sends the session extension request response to WSI 25.

Progressing to step S8 following step S7, WSI 25 transmits session ID to TMM 230, and sends transaction start/extension request.

If the session ID is received, TMM 230 will progress to step S9, and will send the lock request of user information to UCS 37.

If the lock request from TMM 230 is received, UCS 37 will perform the shared lock or the exclusive lock to user information.

Progressing to step S10 following step S9, UCS 37 sends the lock request response to TMM 230.

Figure 6:
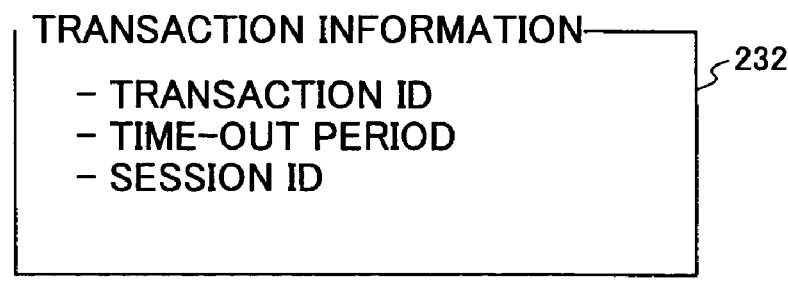
FIG. 6 is a diagram showing an example of transaction information.

If the lock request response from UCS 37 is received, TMM 230 will create transaction information as shown in FIG. 6, and will start the transaction.

In addition, the arrow 303 in FIG. 4 indicates the time-out period for which TMM 230 holds the transaction information.

FIG. 6 shows an example of transaction information.

As shown in FIG. 6, the transaction information 232 includes the incidental information, such as transaction ID, time-out period, and session ID. In addition, the time-out period is the term of validity of the transaction.

Progressing to step S11 following step S10, TMM 230 sends transaction start/extension request response to WSI 25.

If the transaction start/extension request response from TMM 230 is received, WSI 25 will progress to step S12, and will send the function request to WSF 26.

Progressing to step S13 following step S12, WSF 26 sends the function request to UCS 37.

UCS 37 will perform processing (for example, acquisition of user information) concerning user information according to the function request, if the function request from WSF 26 is received.

After the processing according to the function request, UCS 37 progresses to step S14 following step S13, and sends the function-request response to WSF 26.

Progressing to step S15 following step S14, WSF 26 sends the function-request response to WSI 25.

And it progresses to step S16 following step S15, and WSI 25 sends the function-request response to the client 200.

Steps S5-S16 are an example of the processing which implicitly starts the transaction according to the function request received from the client 200.

In addition, the implicit starting/ending of the transaction means that starting/ending of the transaction is performed with any request, other than the transaction start request, used as the trigger.

At step S17, the client 200 transmits the ticket to the multi-function peripheral system 1, and sends the function request (for example, setEntries). WSI 25 receives the ticket through HTTPD 220 of NCS 31.

Progressing to step S18 following step S17, WSI 25 acquires the session ID and client ID according to the ticket, and transmits the session ID and client ID to SMM 240, so that the session extension request is performed.

If the session ID and client ID are received, SMM 240 will extend the time-out period contained in session information as shown in FIG. 5, and will extend the session.

In addition, the arrow 304 in FIG. 4 indicates the time-out period for which SMM 240 holds the session information. Thus, SMM 240 will changes the time-out period for which the session information is held, to the period indicated by the arrow 304 from the period indicated by the arrow 302, if the function request is received from the client 200.

After SMM 240 extends the session, it progresses to step S19 following step S18, and sends the session extension request response to WSI 25.

Progressing to step S20 following step S19, WSI 25 transmits transaction ID to TMM 230, and sends transaction start/extension request.

Namely, if the transaction ID is received before the time-out period of holding the transaction information, indicated by the arrow 303, expires, TMM 230 will extend the time-out period contained in transaction information as shown in FIG. 6, and will extend the transaction.

In addition, the arrow 305 in FIG. 4 indicates the time-out period for which TMM 230 holds the transaction information.

Progressing to step S21 following step S20, TMM 230 sends transaction start/extension request response to WSI 25.

If the transaction start/extension request response from TMM 230 is received, WSI 25 will progress to step S22, and will send the function request to WSF 26.

Progressing to step S23 following step S22, WSF 26 sends the function request to UCS 37.

UCS 37 will perform processing (for example, setup of user information) concerning user information according to the function request, if the function request from WSF 26 is received.

After the processing according to the function request, UCS 37 progresses to step S24 following step S23, and sends the function-request response to WSF 26. p Progressing to step S25 following step S24, WSF 26 sends the function-request response to WSI 25.

And it progresses to step S26 following step S25, and WSI 25 sends the function-request response to the client 200.

If TMM 230 does not receive transaction ID during the time-out period of holding the transaction, indicated by the arrow 305, it progresses to step S27, and it sends the unlock request of user information to UCS 37.

UCS 37 will perform unlocking of the shared lock or the exclusive lock to user information, if the unlock request from TMM 230 is received.

Progressing to step S28 following step S27, UCS 37 sends the unlock request response to TMM 230.

In addition, if TMM 230 does not receive transaction ID during the time-out period of holding the transaction, indicated by the arrow 305, it deletes the transaction information as shown in FIG. 6, and ends the transaction.

Moreover, if SMM 240 does not receive session ID during the time-out period of holding the session, indicated by the arrow 304, it deletes the session information as shown in FIG. 5, and ends the session.

According to the information-processing method of FIG. 4, while the session and the transaction are distinguished, the starting/ending of the session and the starting/ending of the transaction can be performed implicitly.

Next, a description will be given of the second preferred embodiment of the invention.

Figure 7:
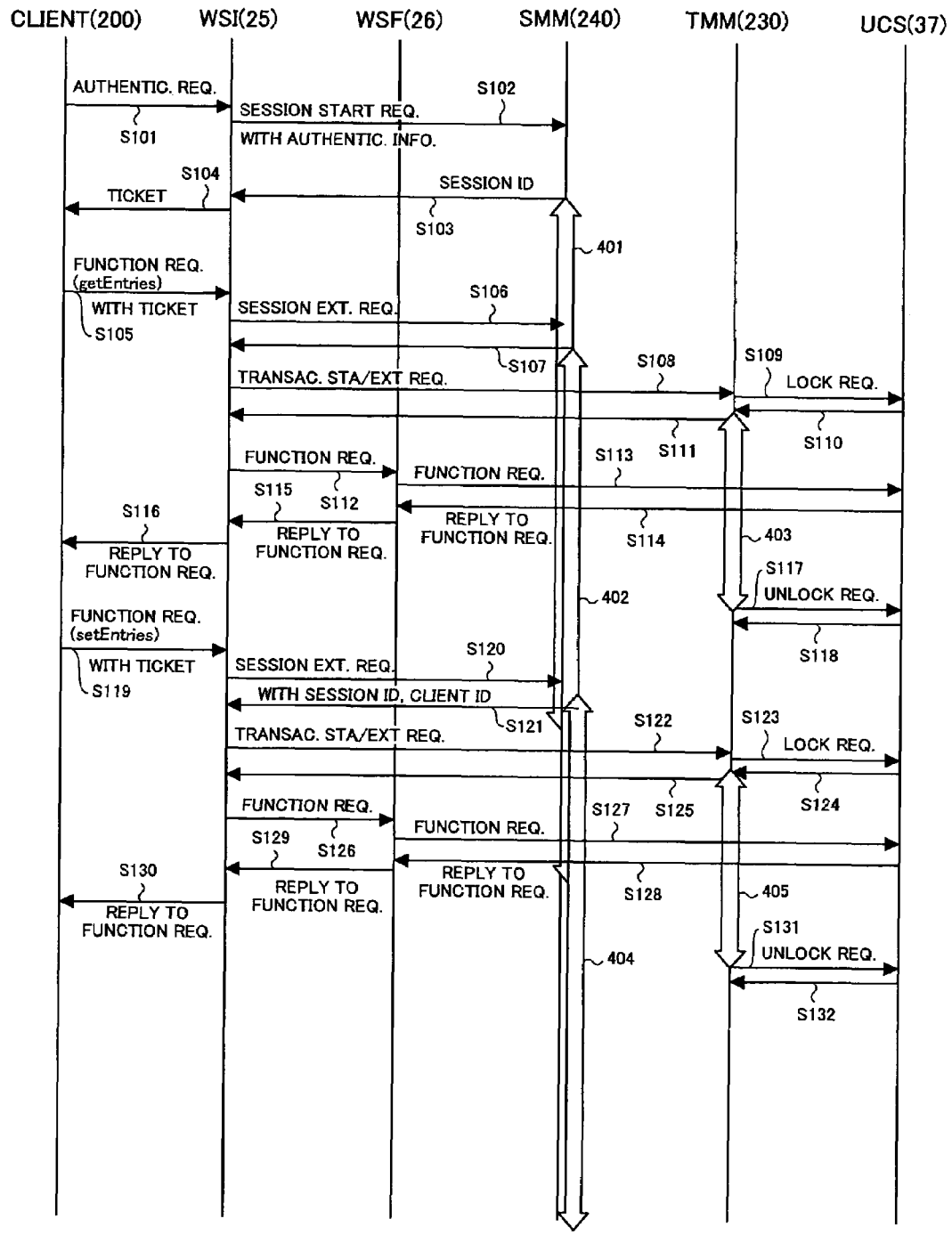
FIG. 7 is a sequence diagram for explaining a second preferred embodiment of the information-processing method of the invention.

The system of FIG. 3 performs processing indicated by the sequence diagram of FIG. 7. FIG. 7 shows the second preferred embodiment of the information-processing method of the invention.

Unless otherwise specified, in FIG. 7, a description of the steps which are essentially the same as corresponding steps in the sequence diagram of FIG. 4 will be omitted.

Processing of steps S101-S116 is equivalent to processing of steps S1-S16 of FIG. 4, and a description thereof will be omitted.

If TMM 230 does not receive transaction ID during the time-out period of holding the transaction information, indicated by the arrow 403, it progresses to step S117, and it sends the unlock request of user information to UCS 37.

UCS 37 will perform unlocking of the shared lock or the exclusive lock to user information, if the unlock request from TMM 230 is received.

Progressing to step S118 following step S117, UCS 37 sends the unlock request response to TMM 230.

In addition, if TMM 230 does not receive transaction ID during the time-out period of holding the transaction, indicated by the arrow 403, it deletes the transaction information as shown in FIG. 6, and ends the transaction.

Processing of steps S119-S121 is equivalent to processing of steps S17-S19 of FIG. 4, and a description thereof will be omitted.

Progressing to step S122 following step S121, WSI 25 transmits transaction ID to TMM 230, and sends transaction start/extension request.

If TMM 230 receives transaction ID during the time-out period of holding the transaction information, indicated by the arrow 403, it progresses to step S123 and sends the lock request of user information to UCS 37.

If the lock request from TMM 230 is received, UCS 37 will perform the shared lock or the exclusive lock to user information.

Progressing to step S124 following step S123, UCS 37 sends the lock request response to TMM 230.

If the lock request response from UCS 37 is received, TMM 230 will create transaction information as shown in FIG. 6 again, and will start the transaction.

In addition, the arrow 405 in FIG. 7 indicates the time-out period for which TMM 230 holds the transaction information.

Progressing to step S125 following step S124, TMM 230 sends transaction start/extension request response to WSI 25.

Processing of steps S126-S132 is equivalent to processing of steps S22-S28 of FIG. 4, and a description thereof will be omitted.

As described above, according to the information-processing method of FIG. 7, it is possible to perform the starting of the transaction implicitly by distinguishing the session and the transaction, even when the transaction is terminated by the time-out before receiving the following function request.

Next, a description will be given of the third preferred embodiment of the invention.

Figure 8:
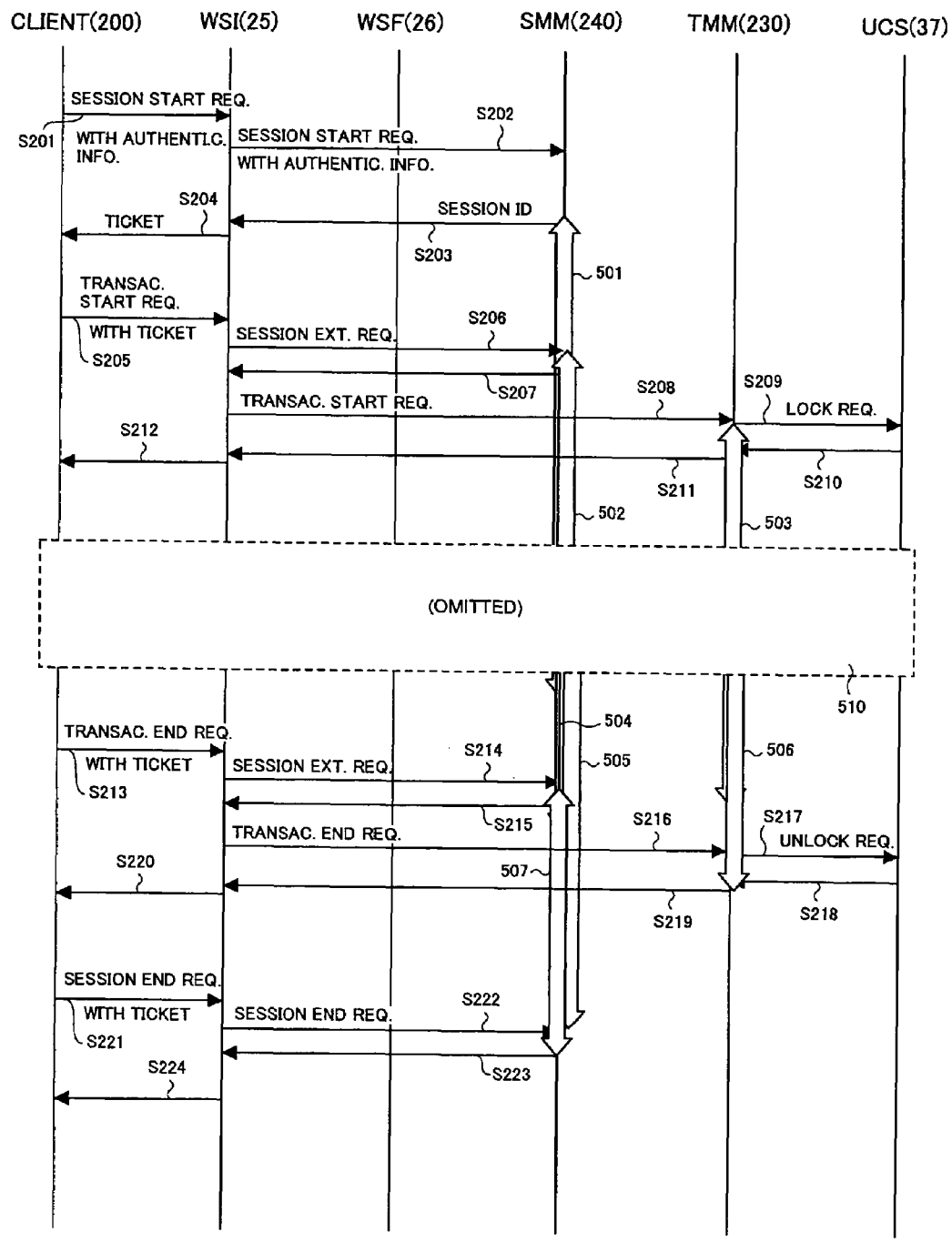
FIG. 8 is a sequence diagram for explaining a third preferred embodiment of the information-processing method of the invention.

The system of FIG. 3 performs processing indicated by the sequence diagram of FIG. 8. FIG. 8 shows the third preferred embodiment of the information-processing method of the invention.

At step S201, the client 200 transmits a part or all of the information required for user authentication to the multi-function peripheral system 1, and sends the session start request.

WSI 25 of the multi-function peripheral system 1 receives a part or all of the information required for user authentication through HTTPD 220 of NCS 31.

Progressing to step S202 following step S201, WSI 25 transmits a part or all of the information required for user authentication to SMM 240, and sends the session start request.

If a part or all of the information required for user authentication is received, SMM 240 will create session information as shown in FIG. 5, and will start the session.

In addition, the arrow 501 in FIG. 8 indicates the time-out period for which SMM 240 holds the session information.

Progressing to step S203 following step S202, SMM 240 transmits the session ID contained in the created session information to WSI 25.

WSI 25 will generate the ticket according to the session ID, if the session ID is received.

Progressing to step S204 following step S203, WSI 25 transmits the ticket to the client 200 as a session start request response.

Steps S201-S204 are an example of the processing which explicitly starts the session in response to the session start request received from the client 200. In addition, the explicit starting of the session means that starting of the session is performed with the session start request used as the trigger.

At step S205, the client 200 transmits the ticket to the multi-function peripheral system 1, and sends the transaction start request. WSI 25 receives the ticket through HTTPD 220 of NCS 31.

Progressing to step S206 following step S205, WSI 25 acquires the session ID and client ID according to the ticket, and transmits the session ID and client ID to SMM 240, and sends the session extension request.

If the session ID and client ID are received, SMM 240 will extend the time-out period contained in session information as shown in FIG. 5, and will extend the session.

In addition, the arrow 502 in FIG. 8 indicates the time-out period for which SMM 240 holds the session information. Thus, SMM 240 changes the time-out period of holding the session information, to the period indicated by the arrow 502 from the period indicated by the arrow 501, based on the transaction start request received from the client 200.

After SMM 240 extends the session, it progresses to step S207 following step S206, and sends the session extension request response to WSI 25.

Progressing to step S208 following step S207, WSI 25 transmits the session ID to TMM 230, and sends the transaction start request.

If the session ID is received, TMM 230 will progress to step S209, and will send the lock request of user information to UCS 37.

If the lock request from TMM 230 is received, UCS 37 will perform the shared lock or the exclusive lock to user information.

Progressing to step S210 following step S209, UCS 37 sends the lock request response to TMM 230.

If the lock request response from UCS 37 is received, TMM 230 will create transaction information as shown in FIG. 6, and will start the transaction.

In addition, the arrow 503 in FIG. 8 indicates the time-out period for which TMM 230 holds the transaction information.

Progressing to step S211 following step S210, TMM 230 sends the transaction start request response to WSI 25.

If the transaction start request response from TMM 230 is received, WSI 25 will progress to step S212, and will send the transaction start request response to the client 200.

Steps S205-S212 are an example of the processing which explicitly starts the transaction in response to the transaction start request received from the client 200.

In addition, the explicit starting of the transaction means that starting of the transaction is performed with the transaction start request used as the trigger.

In the dotted line range 510, the processing that is the same as the processing of steps S5-S8 and S11-S26 of FIG. 4 is performed, and a description thereof will be omitted.

At step S213, the client 200 transmits the ticket to the multi-function peripheral system 1, and sends the transaction end request. WSI 25 receives the ticket through HTTPD 220 of NCS 31.

Progressing to step S214 following step S213, WSI 25 acquires the session ID and client ID according to the ticket, and transmits the session ID and client ID to SMM 240, and sends the session extension request.

If the session ID and client ID are received, SMM 240 will extend the time-out period contained in session information as shown in FIG. 5, and will extend the session.

In addition, the arrow 507 in FIG. 8 indicates the time-out period for which SMM 240 holds the session information. Thus, SMM 240 changes the time-out period of holding the session information to the period indicated by the arrow 507 from the period indicated by the arrow 505, based on the transaction end request received from the client 200.

After SMM 240 extends the session, it progresses to step S215 following step S214, and sends the session extension request response to WSI 25.

Progressing to step S216 following step S215, WSI 25 transmits the transaction ID to TMM 230, and sends the transaction end request.

If the transaction ID is received, TMM 230 will progress to step S217, and will send the unlock request of user information to UCS 37. UCS 37 will perform unlocking of the shared lock or the exclusive lock to user information, if the unlock request from TMM 230 is received.

Progressing to step S218 following step S217, UCS 37 sends the unlock request response to TMM 230.

If the unlock request response from UCS 37 is received, TMM 230 will delete the transaction information as shown in FIG. 6, and will end the transaction.

Progressing to step S219 following step S218, TMM 230 sends the transaction end request response to WSI 25.

If the transaction end request response from TMM 230 is received, WSI 25 will progress to step S220, and will send the transaction end request response to the client 200.

Steps S213-S220 are an example of the processing which explicitly ends the transaction in response to the transaction end request received from the client 200. In addition, the explicit ending of the transaction means that ending of the transaction is performed with the transaction end request used as the trigger.

At step S221, the client 200 transmits the ticket to the multi-function peripheral system 1, and sends the session end request. WSI 25 of the multi-function peripheral system 1 receives the ticket through HTTPD 220 of NCS 31.

Progressing to step S222 following step S221, WSI 25 transmits the session ID to SMM 240, and sends the session end request.

If the session ID is received, SMM 240 will delete the session information as shown in FIG. 5, and will end the session.

Progressing to step S223 following step S222, SMM 240 sends the session end request response to WSI 25.

If the session end request response from SMM 240 is received, WSI 25 will progress to step S224, and will send the session end request response to the client 200.

Steps S221-S224 are an example of the processing which explicitly ends the session in response to the session end request received from the client 200. In addition, the explicit ending of the session means that ending of the session is performed with the session end request used as the trigger.

As described above, according to the information-processing method of FIG. 8, the session and the transaction can be distinguished, and it is possible to perform the explicit starting/ending of the session and the explicit starting/ending of the transaction.

Next, a description will be given of the fourth preferred embodiment of the invention.

Figure 9:
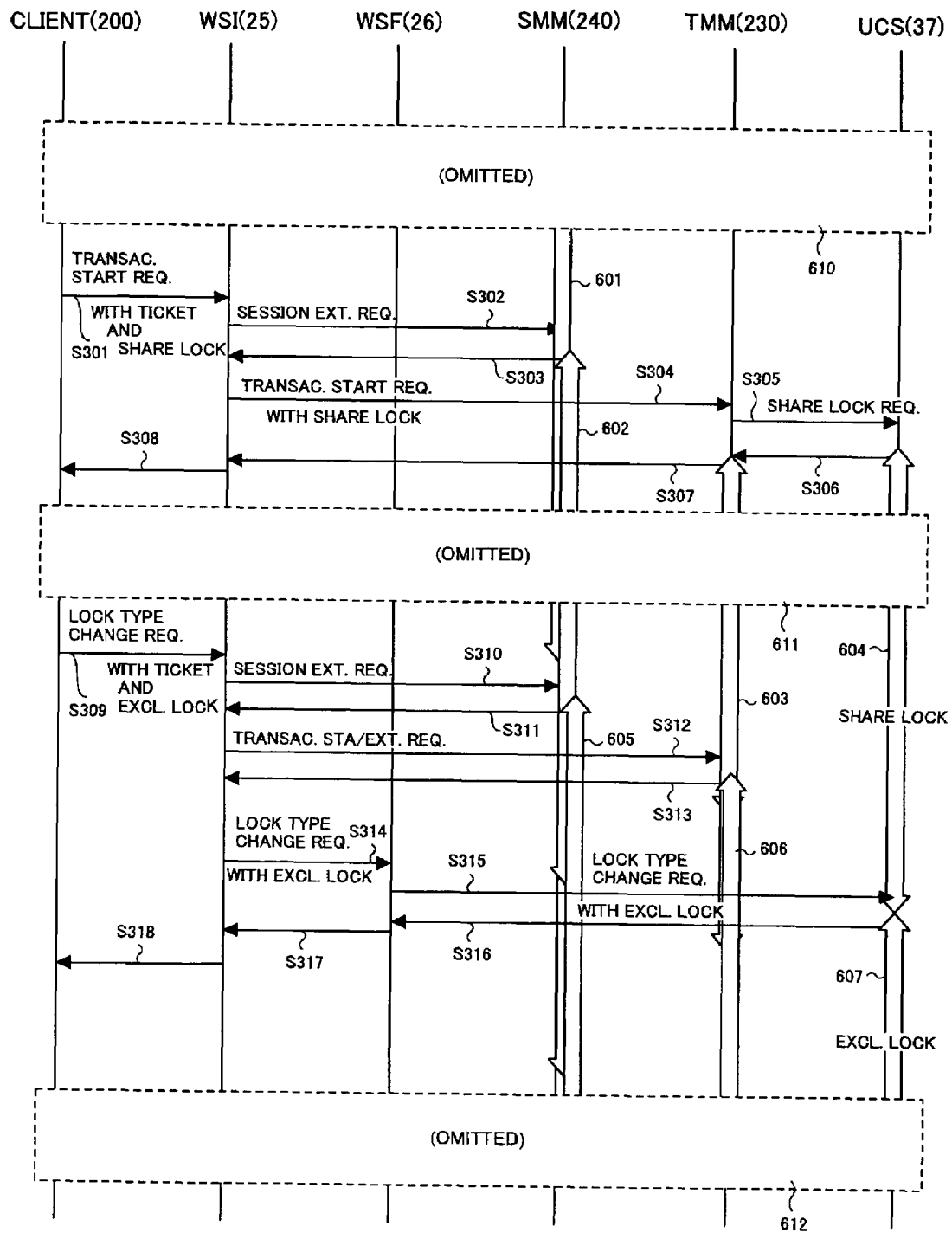
FIG. 9 is a sequence diagram for explaining a fourth preferred embodiment of the information-processing method of the invention.

The system of FIG. 3 performs processing indicated by the sequence diagram of FIG. 9. FIG. 9 shows the fourth preferred embodiment of the information-processing method of the invention.

In the dotted line range 610, the processing that is the same as the processing of steps S201-S204 of FIG. 8 is performed, and a description thereof will be omitted.

At step S301, the client 200 transmits the ticket and lock type (for example, shared lock) to the multi-function peripheral system 1, and sends the transaction start request. WSI 25 receives the ticket and lock type through HTTPD 220 of NCS 31.

In addition, processing of steps S302 and S303 is equivalent to processing of steps S206 and S207 of FIG. 8, and a description thereof will be omitted.

At step S304, WSI 25 transmits the session ID and lock type to TMM 230, and sends the transaction start request.

If the session ID and lock type are received, TMM 230 will progress to step S305, and will give the lock request (for example, shared lock request) according to the lock type to UCS 37.

If the shared lock request from TMM 230 is received, UCS 37 will perform the lock (for example, shared lock) of the lock type to user information.

The arrow 604 in FIG. 9 indicates the time-out period for which UCS 37 performs the shared lock.

Progressing to step S306 following step S305, UCS 37 sends the lock request response according to the lock type to TMM 230.

In addition, processing of steps S307 and S308 is equivalent to processing of steps S211 and S212 of FIG. 8, and a description thereof will be omitted.

Moreover, steps S301-S308 are an example of the processing which explicitly specifies lock type at the time of the transaction start.

In the dotted line range 611, the processing that is the same as the processing of steps S5-S8 and S11-S16 of FIG. 4 is performed, and a description thereof will be omitted.

At step S309, the client 200 transmits the ticket and lock type (for example, exclusive lock) to the multi-function peripheral system 1, and sends the lock type change request. WSI 25 receives the ticket and lock type through HTTPD 220 of NCS 31.

In addition, processing of steps S310-S313 is equivalent to processing of steps S18-S21 of FIG. 4, and a description thereof will be omitted.

At step S314, WSI 25 transmits the lock type to WSF 26, and sends the lock type change request.

Progressing to step S315 following step S314, WSF 26 sends the lock type change request to UCS 37.

UCS 37 will perform the lock (for example, exclusive lock) of the lock type to user information, if the lock type change request from WSF 26 is received.

In addition, the arrow 607 in FIG. 9 indicates the time-out period for which UCS 37 performs the exclusive lock.

Progressing to step S316 following step S315, UCS 37 sends the lock type change request response to WSF 26.

Progressing to step S317 following step S316, WSF 26 sends the lock type change request response to WSI 25.

Progressing to step S318 following step S317, WSI 25 sends the lock type change request response to the client 200.

Steps S309-S318 are an example of the processing which explicitly changes lock type during the transaction.

In addition, in the dotted line range 612, the processing that is the same as the processing of steps S217-S226 of FIG. 4 and steps S213-S224 of FIG. 8 is performed, and a description thereof will be omitted.

As described above, according to the information-processing method of FIG. 9, the session and the transaction can be distinguished, the lock type can be explicitly specified at the time of the start of the transaction, and the lock type can be explicitly changed during the transaction.

Next, a description will be given of the fifth preferred embodiment of the information-processing method of the invention.

Figure 10:
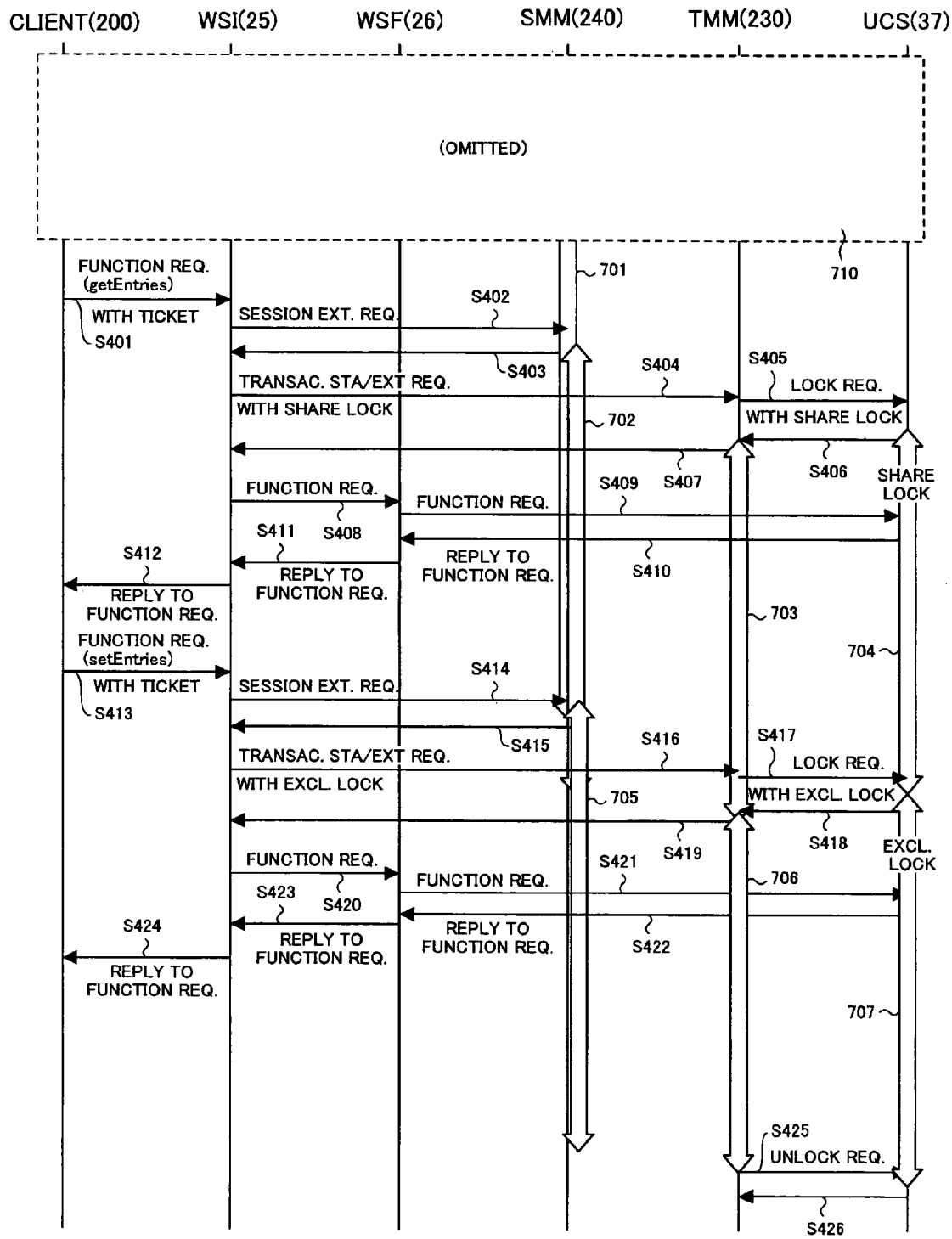
FIG. 10 is a sequence diagram for explaining a fifth preferred embodiment of the information-processing method of the invention.

The system of FIG. 3 performs processing indicated by the sequence diagram of FIG. 10. FIG. 10 shows the fifth preferred embodiment of the information-processing method of the invention.

In the dotted line range 710, the processing that is the same as the processing of steps S1-S4 of FIG. 4 is performed, and a description thereof will be omitted.

Moreover, processing of steps S401-S403 is equivalent to processing of steps S5-S7 of FIG. 4, and a description thereof will be omitted.

At step S404, WSI 25 transmits the session ID and lock type (for example, shared lock) to TMM 230, and sends the transaction start/extension request.

In addition, WSI 25 chooses implicitly lock type (the shared lock or exclusive lock) according to the function request which is received at step S401.

If the session ID and lock type are received, TMM 230 will progress to step S405, will transmit the lock type to UCS 37, and will send the lock request.

If the lock type is received from TMM 230, UCS 37 will perform the lock (for example, shared lock) of the lock type to user information.

The arrow 704 in FIG. 10 indicates the time-out period for which UCS 37 performs the shared lock.

Progressing to step S406 following step S405, UCS 37 sends the lock request response to TMM 230.

Progressing to step S407 following step S406, TMM 230 sends the transaction start/extension request response to WSI 25.

In addition, processing of steps S408-S412 is equivalent to processing of steps S12-S16 of FIG. 4, and a description thereof will be omitted. Steps S401-S412 are an example of the processing which implicitly specifies the lock type at the time of the transaction start.

Processing of steps S413-S415 is equivalent to processing of steps S17-S19 of FIG. 4, and a description thereof will be omitted.

At step S416, WSI 25 transmits the transaction ID and lock type (for example, exclusive lock) to TMM 230, and sends the transaction start/extension request.

In addition, WSI 25 chooses implicitly lock type (the shared lock or exclusive lock) according to the function request which is received at step S413.

If the session ID and lock type are received, TMM 230 will progress to step S417, will transmit the lock type to UCS 37, and will send the lock request.

If the lock type is received from TMM 230, UCS 37 will perform the lock (for example, exclusive lock) of the lock type to user information.

The arrow 707 in FIG. 10 indicates the time-out period for which UCS 37 performs the exclusive lock.

Progressing to step S418 following step S417, UCS 37 sends the lock request response to TMM 230.

Progressing to step S419 following step S418, TMM 230 sends the transaction start/extension request response to WSI 25.

In addition, processing of steps S420-S426 is equivalent to processing of steps S22-S28 of FIG. 4, and a description thereof will be omitted.

Steps S401-S412 are an example of the processing which implicitly changes the lock type during the transaction.

In the sequence diagrams of FIG. 9 and FIG. 10, the lock type can be specified or changed by making use of the input argument of each function request.

Alternatively, it is possible to configure the system such that the shared lock is performed during the session, and the exclusive lock is performed when required.

As described above, according to the information-processing method of FIG. 10, the session and the transaction can be distinguished, the implicit specification of the lock type can be carried out at the time of the start of the transaction, and the implicit change of the lock type is made during the transaction.

Next, a description will be given of the sixth preferred embodiment of the information-processing method of the invention.

Figure 11:
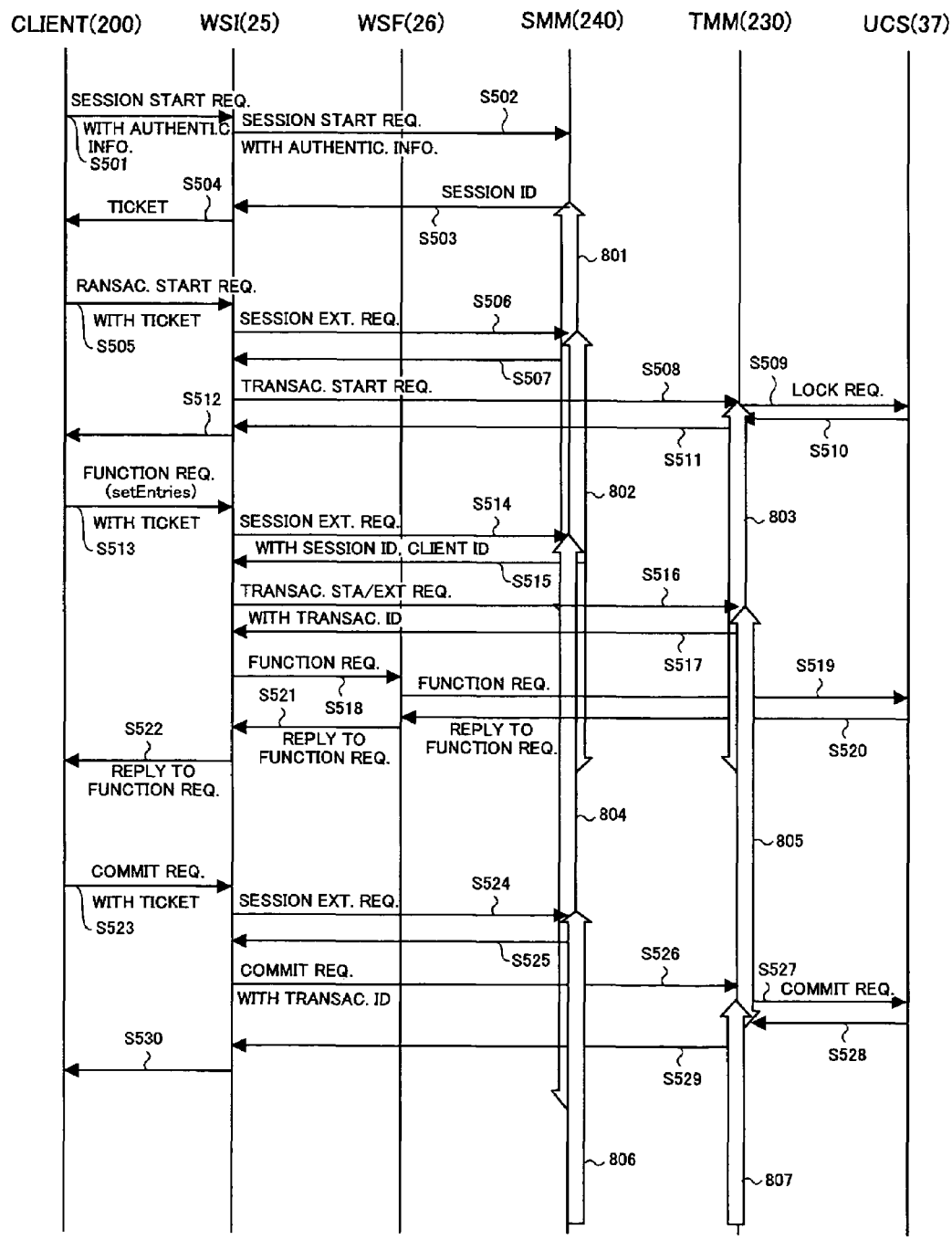
FIG. 11 is a sequence diagram for explaining a sixth preferred embodiment of the information-processing method of the invention.
Figure 12:
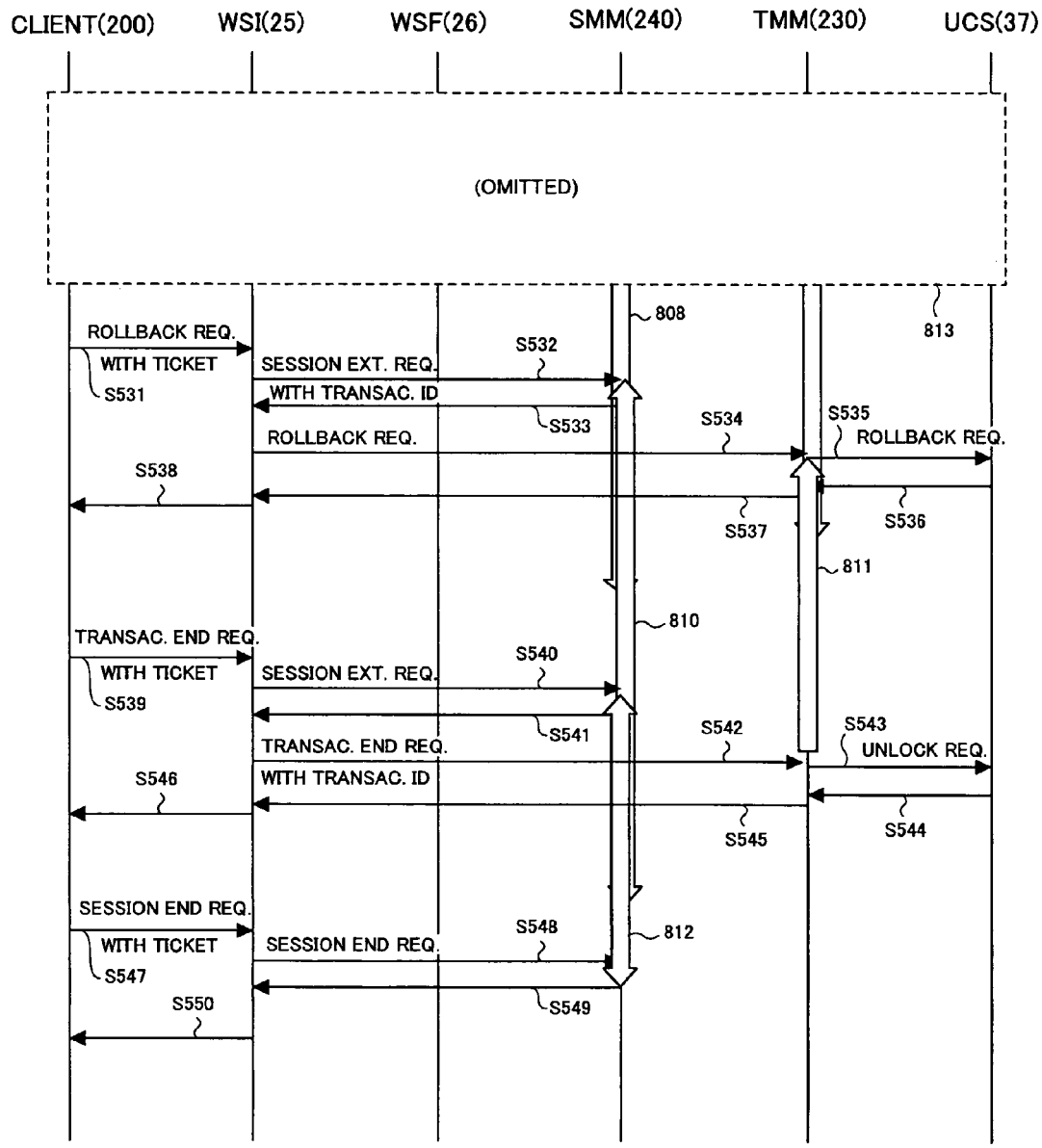
FIG. 12 is a sequence diagram for explaining the sixth preferred embodiment of the information-processing method of the invention.

The system of FIG. 3 performs processing indicated by the sequence diagrams of FIG. 11 and FIG. 12. FIG. 11 and FIG. 12 show the sixth preferred embodiment of the information-processing method of the invention.

Processing of steps S501-S512 is the same as that of steps S201-S212 of FIG. 8, and a description thereof will be omitted.

At step S513, the client 200 transmits the ticket to the multi-function peripheral system 1, and sends the function request. WSI 25 receives the ticket through HTTPD 220 of NCS 31.

Progressing to step S514 following step S513, WSI 25 acquires the session ID and client ID according to the ticket, and transmits the session ID and client ID to SMM 240, and sends the session extension request.

If the session ID and client ID are received, SMM 240 will extend the time-out period contained in session information as shown in FIG. 5, and will extend the session.

The arrow 804 in FIG. 11 indicates the time-out period for which SMM 240 holds the session information. Thus, SMM 240 will change the time-out period of holding the session information to the period indicated by the arrow 804 from the period indicated by the arrow 802, if the function request is received from the client 200.

After SMM 240 extends the session, it progresses to step S515 following step S514, and sends the session extension request response to WSI 25.

Progressing to step S516 following step S515, WSI 25 transmits the transaction ID to TMM 230, and sends the transaction start/extension request.

If the transaction ID is received before the time-out period of holding the transaction information, indicated by the arrow 803, TMM 230 will extend the time-out period contained in transaction information as shown in FIG. 6, and will extend the transaction.

The arrow 805 in FIG. 11 indicates the time-out period for which TMM 230 holds the transaction information.

Progressing to step S517 following step S516, TMM 230 sends the transaction start/extension request response to WSI 25.

If the transaction start/extension request response from TMM 230 is received, WSI 25 will progress to step S518, and will send the function request to WSF 26.

Progressing to step S519 following step S518, WSF 26 sends the function request to UCS 37. UCS 37 will perform processing concerning user information according to the function request, if the function request from WSF 26 is received.

After the processing according to the function request, UCS 37 progresses to step S520 following step S519, and sends the function-request response to WSF 26.

Progressing to step S521 following step S520, WSF 26 sends the function-request response to WSI 25.

And it progresses to step S522 following step S521, and WSI 25 sends the function-request response to the client 200.

It progresses to step S523, and the client 200 transmits the ticket to the multi-function peripheral system 1, and sends the commitment request. WSI 25 receives the ticket through HTTPD 220 of NCS 31.

Progressing to step S524 following step S523, WSI 25 acquires the session ID and client ID according to the ticket, and transmits the session ID and client ID to SMM 240, and sends the session extension request.

If the session ID and client ID are received, SMM 240 will extend the time-out period contained in session information as shown in FIG. 5, and will extend the session.

The arrow 806 in FIG. 11 indicates the time-out period for which SMM 240 holds the session information. Thus, SMM 240 changes the time-out period of holding the session information to the period indicated by the arrow 806 from the period indicated by the arrow 804, if the commitment request is received from the client 200.

After SMM 240 extends the session, it progresses to step S525 following step S524, and sends the session extension request response to WSI 25.

Progressing to step S526 following step S525, WSI 25 transmits the transaction ID to TMM 230, and sends the commitment request.

If the transaction ID is received before the time-out, TMM 230 will extend the time-out period contained in transaction information as shown in FIG. 6, and will extend the transaction.

Progressing to step S527, TMM 230 sends the commitment request to UCS 37.

If the commitment request from TMM 230 is received, UCS 37 will reflect the setting information indicated by the function request.

Progressing to step S528 following step S527, UCS 37 sends the commitment request response to TMM 230.

If the commitment request response from UCS 37 is received, TMM 230 will progress to step S529, and will send the commitment request response to WSI 25.

And it progresses to step S530 following step S529, and WSI 25 sends the commitment request response to the client 200.

Referring to FIG. 12, in the dotted line range 813, the function request of steps S513-S522 of FIG. 11 and the commitment request of steps S523-S530 of FIG. 11 are performed repeatedly, and a description thereof will be omitted.

At step S531, the client 200 transmits the ticket to the multi-function peripheral system 1, and sends the roll-back request. WSI 25 receives the ticket through HTTPD 220 of NCS 31.

Progressing to step S532 following step S531, WSI 25 acquires the session ID and client ID according to the ticket, and transmits the session ID and client ID to SMM 240, and sends the session extension request.

If the session ID and client ID are received, SMM 240 will extend the time-out period contained in session information as shown in FIG. 5, and will extend the session.

After SMM 240 extends the session, it progresses to step S533 following step S532, and sends the session extension request response to WSI 25.

Progressing to step S534 following step S533, WSI 25 transmits the transaction ID to TMM 230, and sends the roll-back request.

If the transaction ID is received before the time-out, TMM 230 will extend the time-out period contained in transaction information as shown in FIG. 6, and will extend the transaction.

Progressing to step S535, TMM 230 sends the roll-back request to UCS 37.

If the roll-back request from TMM 230 is received, UCS 37 will delete the setting information currently held in order to repeal the function request performed after the last commitment request. For example, when the commitment request of step S523 is the last commitment request, UCS 37 deletes the setting information indicated by the function request in order to repeal the function request performed in the dotted line range 813.

Progressing to step S536 following step S535, UCS 37 sends the roll-back request response to TMM 230.

If the roll-back request response from UCS 37 is received, TMM 230 will progress to step S537, and will send the roll-back request response to WSI 25.

Progressing to step S538 following step S537, WSI 25 sends the roll-back request response to the client 200.

In addition, processing of steps S539-S550 is the same as processing of steps S213-S224 of FIG. 8, and a description thereof will be omitted.

In the sequence diagram of FIG. 11, the explicit commitment request is sent from the client 200 to UCS 37 in steps S523-S527. Alternatively, it may be possible to perform the implicit commitment in the function request processing of steps S513-S522 instead.

Moreover, if the transaction end request of step S539 is sent before the function request is committed, the function request sent after the last commitment request will become invalid in the unlock request processing of step S543, without being committed.

In addition, whether the function request sent after the last commitment request is made invalid in the unlock request processing of step S543 or not may be determined by setting the arguments of the unlock request selectively.

As described above, according to the information-processing method of FIG. 11 and FIG. 12, it is possible to perform the commitment request and the roll-back request during the transaction.

In addition, the sequence diagrams of FIG. 11 and FIG. 12 are an example of the processing in which UCS 37 corresponds to the transaction, and the execution of the commitment and the roll back is possible when required.

Next, a description will be given of the seventh preferred embodiment of the information-processing method of the invention.

Figure 13:
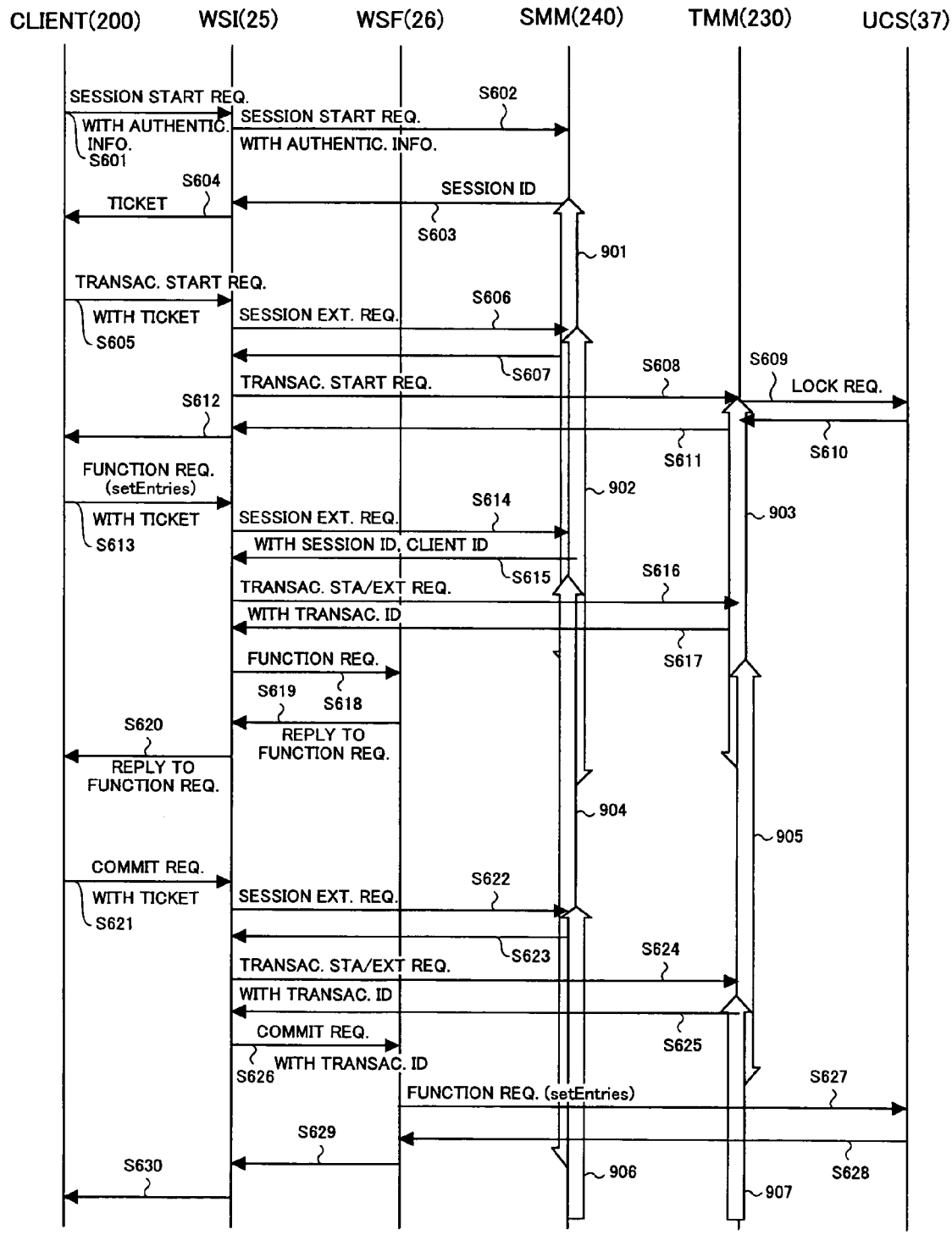
FIG. 13 is a sequence diagram for explaining a seventh preferred embodiment of the information-processing method of the invention.
Figure 14:
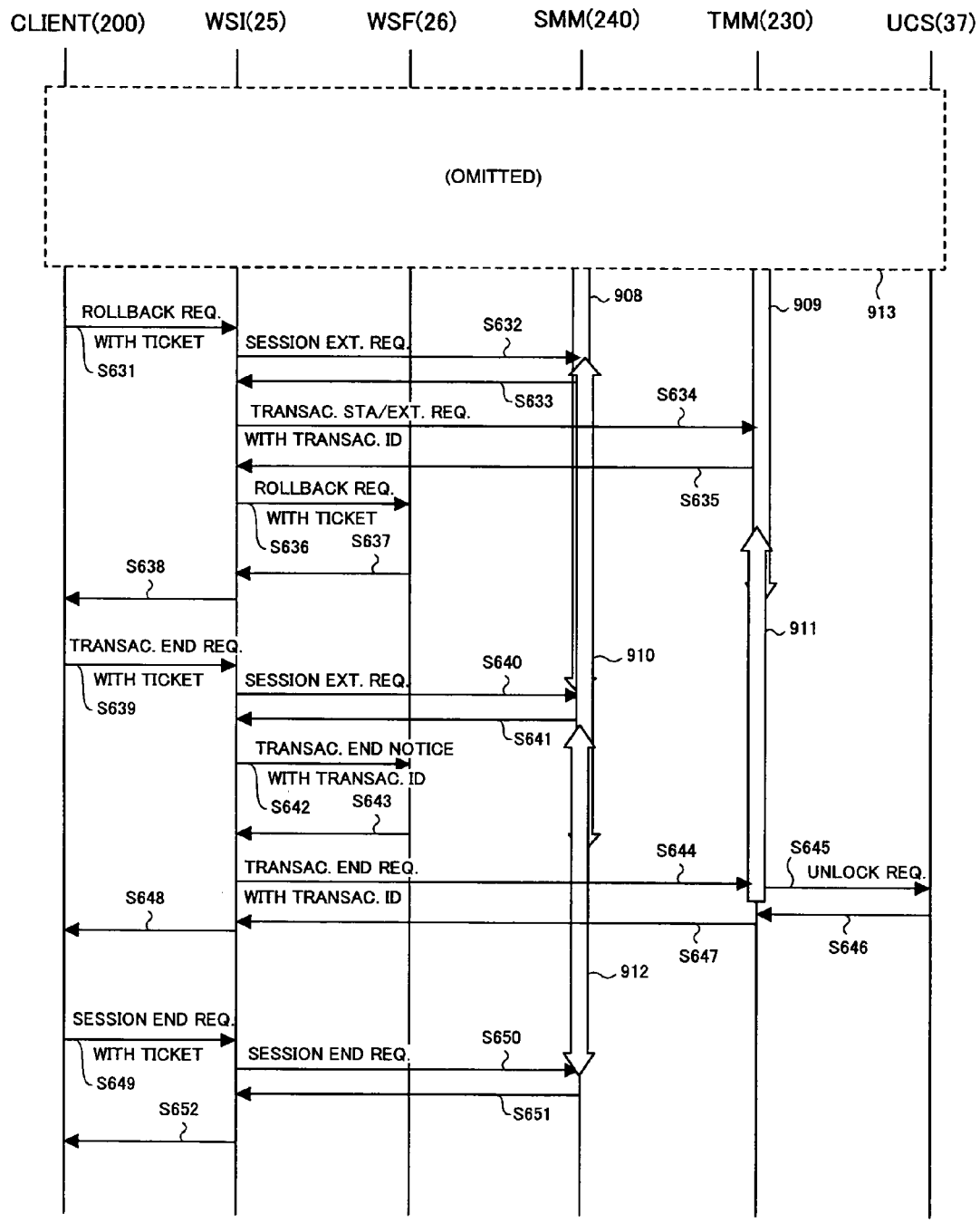
FIG. 14 is a sequence diagram for explaining the seventh preferred embodiment of the information-processing method of the invention.

The system of FIG. 3 performs processing indicated by the sequence diagrams of FIG. 13 and FIG. 14. FIG. 13 shows the seventh preferred embodiment of the information-processing method of the invention. Moreover, FIG. 14 shows the seventh preferred embodiment of the information-processing method of the invention.

Since processing of steps S601-S617 is the same as that of steps S501-S517 of FIG. 11, a description thereof will be omitted.

If the transaction start/extension request response from TMM 230 is received, WSI 25 will progress to step S618, and will send the function request to WSF 26.

If the function request is received, WSF 26 will perform processing concerning user information according to the function request.

After the processing according to the function request is performed, WSF 26 correlates the setting information with the transaction ID, and holds the same.

Progressing to step S619, WSF 26 sends the function-request response to WSI 25. Progressing to step S620 following step S619, WSI 25 sends the function-request response to the client 200.

Progressing to step S621, the client 200 transmits the ticket to the multi-function peripheral system 1, and sends the commitment request. WSI 25 receives the ticket through HTTPD 220 of NCS 31.

Progressing to step S622 following step S621, WSI 25 acquires the session ID and client ID according to the ticket, and transmits the session ID and client ID to SMM 240, and sends the session extension request.

If the session ID and client ID are received, SMM 240 will extend the time-out period contained in session information as shown in FIG. 5, and will extend the session.

After SMM 240 extends the session, it progresses to step S623 following step S622, and sends the session extension request response to WSI 25.

Progressing to step S624 following step S623, WSI 25 transmits the transaction ID to TMM 230, and sends the transaction start/extension request.

If the transaction ID is received before the time-out, TMM 230 will extend the time-out period contained in transaction information as shown in FIG. 6, and will extend the transaction.

Progressing to step S625 following step S624, TMM 230 sends the transaction start/extension request response to WSI 25.

If the transaction start/extension request response from TMM 230 is received, WSI 25 will progress to step S626, will transmit the transaction ID to WSF 26, and will send the commitment request.

Progressing to step S627, WSF 26 sends the function request (for example, setEntries) to UCS 37. If the function request from WSF 26 is received, UCS 37 will reflect the setting information indicated by the function request.

Progressing to step S628 following step S627, UCS 37 sends the function request response to WSF 26.

If the function request response from UCS 37 is received, WSF 26 will progress to step S629, and will send the commitment request response to WSI 25.

Progressing to step S630 following step S629, WSI 25 sends the commitment request response to the client 200.

In the dotted line range 913 in FIG. 14, the function request processing of steps S613-S620 of FIG. 13 and the commitment request processing of steps S621-S630 of FIG. 13 are performed repeatedly, and a description thereof will be omitted.

In addition, since processing of steps S631-S633 of FIG. 14 is the same as that of steps S531-S533 of FIG. 12, a description thereof will be omitted.

Progressing to step S634 following step S633, WSI 25 transmits the transaction ID to TMM 230, and sends the transaction start/extension request.

If the transaction ID is received before the time-out, TMM 230 will extend the time-out period contained in transaction information as shown in FIG. 6, and will extend the transaction.

Progressing to step S635 following step S634, TMM 230 sends the transaction start/extension request response to WSI 25.

Progressing to step S636, WSI 25 transmits the transaction ID to WSF 26, and sends the roll-back request.

If the roll-back request from TMM 230 is received, WSF 26 will delete the setting information which is correlated with the transaction ID and held, in order to repeal the function request performed after the last commitment request.

Progressing to step S637 following step S636, WSF 26 sends the roll-back request response to WSI 25.

Progressing to step S638 following step S637, WSI 25 sends the roll-back request response to the client 200.

In addition, processing of steps S639-S641 is the same as processing of steps S213-S215 of FIG. 8, and a description thereof will be omitted.

Progressing to step S642 following step S641, WSI 25 transmits the transaction ID to WSF 26, and sends the notice of the transaction end.

If the transaction ID is received, WSF 26 will progress to step S643, and will send the response of the transaction end notice to WSI 25.

In addition, since processing of steps S644-S652 is the same as processing of steps S542-S550 of FIG. 12, a description thereof will be omitted.

Moreover, if the transaction end request of step S639 is sent before the function request is committed, the function request sent after the last commitment request will become invalid by the transaction end notice of step S642, without being committed.

In addition, whether the function request sent after the last commitment request is made invalid by the transaction end notice of step S642 or not may be determined by setting the arguments of the transaction end notice selectively.

As described above, according to the information-processing method of FIG. 13 and FIG. 14, it is possible to perform the commitment request and the roll-back request during the transaction.

In addition, the sequence diagrams of FIG. 13 and FIG. 14 are an example of the processing in which WSF 26 corresponds to the transaction, and WSF 26 correlates the setting information with the transaction ID and holds the same until it is committed.

Therefore, the multi-function peripheral system 1 in which UCS 37 corresponds to the transaction, and the multi-function peripheral system 1 in which WSF 26 corresponds to the transaction can be provided on the network 210 by using the information-processing method of FIG. 11 and FIG. 12 and the information-processing method of FIG. 13 and FIG. 14.

In addition, FIG. 4 and FIG. 7 through 14 show examples of the processing which implicitly or explicitly starts/ends the session and the processing which implicitly or explicitly starts/ends the transaction in combination.

Therefore, it is possible to make the information-processing method of the present invention include any combination of the processing which implicitly or explicitly starts/ends the session and the processing which implicitly or explicitly starts/ends the transaction. Moreover, the sequence diagrams of FIG. 8 and FIG. 9 may be modified such that the unlock request of user information is sent to UCS 37 similar to step S27, if the transaction end request is not received during the time-out period of holding the transaction. In this case, UCS 37 performs unlocking of the shared lock or the exclusive lock to user information.

Moreover, according to the information-processing apparatus of the present invention, TMM 230 deletes the transaction information as shown in FIG. 6 and ends the transaction, and SMM 240 deletes the session information as shown in FIG. 5 and ends the session.

The present invention is not limited to the above-described embodiments, and variations and modifications may be made without departing from the scope of the present invention.

For example, the first management unit of the information-processing apparatus in the claims may be configured to terminate management of the first processing group based on a predetermined time-out period. Moreover, the second management unit of the information-processing apparatus in the claims may be configured to terminate management of the second processing group based on a predetermined time-out period.

Moreover, the first management unit of the information-processing apparatus in the claims may be configured to manage the session. Moreover, the second management unit of the information-processing apparatus in the claims may be configured to manage the transaction. Furthermore, the information-processing apparatus in the claims may be configured as being an image forming apparatus.

Further, the present application is based on Japanese priority application No. 2003-015346, filed on Jan. 23, 2003, and Japanese priority application No. 2004-006691, filed on Jan. 14, 2004, the entire contents of which are hereby incorporated by reference.

What is claimed is:

1. An information-processing apparatus including a module which provides one or more clients with a function that needs exclusive access control in which user information stored in the information-processing apparatus is exclusively read or updated by a client through authentication, comprising:
   a processor;
   a session management unit configured to interact with the processor and to manage a series of session processing steps and incidental information, wherein said session management unit is configured to
      receive a session start request and information to authenticate the one or more clients,
      create session information including a session ID, a first time-out period, and authentication data, the first time-out period indicating how long the session management unit holds the session information, and
      extend the first time-out period by an amount based on the function that needs exclusive access control if a session extension request including the session ID and a client ID is received during the first time-out period and deleting the session information and ending the session if the session extension request is not received during the first time-out period; and
   a transaction management unit configured to interact with the processor and to manage a series of indivisible transaction processing steps performed by using the function that needs exclusive access control in a state where the transaction processing is continued by extending a second time-out period, which indicates how long transaction information is stored, by an amount based on the function that needs exclusive access control, the transaction information including a transaction ID, the second time-out period, and the session ID,
   wherein the session management unit is configured to start the management of the session processing steps when an express management start request is received from the client or when an implicit request to start management of the session processing steps other than the express management start request is received.

2. An information-processing apparatus including a module which provides one or more clients with a function that needs exclusive access control in which user information stored in the information-processing apparatus is exclusively read or updated by a client through authentication, comprising:
   a processor;
   a session management unit configured to interact with the processor and to manage a series of session processing steps and incidental information, wherein said session management unit is configured to
      receive a session start request and information to authenticate the one or more clients,
      create session information including a session ID, a first time-out period, and authentication data, the first time-out period indicating how long the session management unit holds the session information, and
      extend the first time-out period by an amount based on the function that needs exclusive access control if a session extension request including the session ID and a client ID is received during the first time-out period and deleting the session information and ending the session if the session extension request is not received during the first time-out period; and
   a transaction management unit configured to interact with the processor and to manage a series of indivisible transaction processing steps performed by using the function that needs exclusive access control in a state where the transaction processing is continued by extending a second time-out period, which indicates how long transaction information is stored, by an amount based on the function that needs exclusive access control, the transaction information including a transaction ID. the second time-out period, and the session ID,
   wherein the session management unit is configured to start the management of the session processing steps when an express management start request and an implicit request to start management of the session processing steps other than the express management start request are received from the client.

3. An information-processing apparatus including a module which provides one or more clients with a function that needs exclusive access control in which user information stored in the information-processing apparatus is exclusively read or updated by a client through authentication, comprising:
   a processor;
   a session management unit configured to interact with the processor and to manage a series of session processing steps and incidental information, wherein said session management unit is configured to receive a session start request and information to authenticate the one or more clients, create session information including a session ID, a first time-out period, and authentication data, the first time-out period indicating how long the session management unit holds the session information, and extend the first time-out period by an amount based on the function that needs exclusive access control if a session extension request including the session ID and a client ID is received during the first time-out period and deleting the session information and ending the session if the session extension request is not received during the first time-out period; and a transaction management unit configured to interact with the processor and to manage a series of indivisible transaction processing steps performed by using the function that needs exclusive access control in a state where the transaction processing is continued by extending a second time-out period, which indicates how long transaction information is stored, by an amount based on the function that needs exclusive access control, the transaction information including a transaction ID, the second time-out period, and the session ID, wherein the session management unit is configured to end the management of the session processing steps when a management end request is received from the client or when the first time-out period expires.

4. An information-processing apparatus including a module which provides one or more clients with a function that needs exclusive access control in which user information stored in the information-processing apparatus is exclusively updated by a client through authentication, comprising:

a processor;

a session management unit configured to interact with the processor and to manage a series of session processing steps and incidental information, wherein said session management unit is configured to receive a session start request and information to authenticate the one or more clients, create session information including a session ID, a first time-out period, and authentication data, the first time-out period indicating how long the session management unit holds the session information, and extend the first time-out period by an amount based on the function that needs exclusive access control if a session extension request including the session ID and a client ID is received during the first time-out period and deleting the session information and ending the session if the session extension request is not received during the first time-out period; and a transaction management unit configured to interact with the processor and to manage a series of indivisible transaction processing steps performed by using the function that needs exclusive access control in a state where the transaction processing is continued by extending a second time-out period, which indicates how long transaction information is stored, by an amount based on the function that needs exclusive access control, the transaction information including a transaction ID, the second-time out period, and the session ID, wherein the session management unit is configured to end the management of the session processing steps when a management end request is received from the client and the first time-out period expires.

5. An information-processing apparatus including a module which provides one or more clients with a function that needs exclusive access control in which user information stored in the information-processing apparatus is exclusively read or updated by a client through authentication, comprising:

a processor;

a session management unit configured to interact with the processor and to manage a series of session processing steps and incidental information, wherein said session management unit is configured to receive a session start request and information to authenticate the one or more clients, create session information including a session ID, a first time-out period, and authentication data, the first time-out period indicating how long the session management unit holds the session information, and extend the first time-out period by an amount based on the function that needs exclusive access control if a session extension request including the session ID and a client ID is received during the first time-out period and deleting the session information and ending the session if the session extension request is not received during the first time-out period; and a transaction management unit configured to interact with the processor and to manage a series of indivisible transaction processing steps performed by using the function that needs exclusive access control in a state where the transaction processing is continued by extending a second time-out period, which indicates how long transaction information is stored, by an amount based on the function that needs exclusive access control, the transaction information including a transaction ID, the second time-out period, and the session ID, wherein the transaction management unit is configured to start the management of the transaction processing steps when an express management start request is received from the client or when an implicit request to start management of the transaction processing steps other than the express management start request is received.

6. An information-processing apparatus including a module which provides one or more clients with a function that needs exclusive access control in which user information stored in the information-processing apparatus is exclusively read or updated by a client through authentication, comprising:

a processor;

a session management unit configured to interact with the processor and to manage a series of session processing steps and incidental information, wherein said session management unit is configured to receive a session start request and information to authenticate the one or more clients, create session information including a session ID, a first time-out period, and authentication data, the first time-out period indicating how long the session management unit holds the session information, and extend the first time-out period by an amount based on the function that needs exclusive access control if a session extension request including the session ID and a client ID is received during the first time-out period and deleting the session information and ending the session if the session extension request is not received during the first time-out period; and a transaction management unit configured to interact with the processor and to manage a series of indivisible transaction processing steps performed by using the function that needs exclusive access control in a state where the transaction processing is continued by extending a second time-out period, which indicates how long transaction information is stored, by an amount based on the function that needs exclusive access control, the transaction information including a transaction ID, the second time-out period, and the session ID, wherein the transaction management unit is configured to start the management of the transaction processing steps when an express management start request and implicit request to start management of the transaction processing steps other than the express management start request are received from the client.

7. An information-processing apparatus including a module which provides one or more clients with a function that needs exclusive access control in which user information stored in the information-processing apparatus is exclusively read or updated by a client through authentication, comprising:

a processor;

a session management unit configured to interact with the processor and to manage a series of session processing steps and incidental information, wherein said session management unit is configured to receive a session start request and information to authenticate the one or more clients, create session information including a session ID, a first time-out period, and authentication data, the first time-out period indicating how long the session management unit holds the session information, and extend the first time-out period by an amount based on the function that needs exclusive access control if a session extension request including the session ID and a client ID is received during the first time-out period and deleting the session information and ending the session if the session extension request is not received during the first time-out period; and a transaction management unit configured to interact with the processor and to manage a series of indivisible transaction processing steps performed by using the function that needs exclusive access control in a state where the transaction processing is continued by extending a second time-out period, which indicates how long transaction information is stored, by an amount based on the function that needs exclusive access control, the transaction information including a transaction ID, the second time-out period, and the session ID, wherein the transaction management unit is configured to end the management of the transaction processing steps when a management end request is received from the client or when the second time-out period expires.

8. An information-processing apparatus including a module which provides one or more clients with a function that needs exclusive access control in which user information stored in the information-processing apparatus is exclusively read or updated by a client through authentication, comprising:

a processor;

a session management unit configured to interact with the processor and to manage a series of session processing steps and incidental information, wherein said session management unit is configured to receive a session start request and information to authenticate the one or more clients, create session information including a session ID, a first time-out period, and authentication data, the first time-out period indicating how long the session management unit holds the session information, and extend the first time-out period by an amount based on the function that needs exclusive access control if a session extension request including the session ID and a client ID is received during the first time-out period and deleting the session information and ending the session if the session extension request is not received during the first time-out period; and a transaction management unit configured to interact with the processor and to manage a series of indivisible transaction processing steps performed by using the function that needs exclusive access control in a state where the transaction processing is continued by extending a second time-out period, which indicates how long transaction information is stored, by an amount based on the function that needs exclusive access control, the transaction information including a transaction ID, the second time-out period, and the session ID, wherein the transaction management unit is configured to end the management of the transaction processing steps when a management end request is received from the client and the first time-out period expires.

9. An information-processing apparatus according to claim 5, wherein the transaction management unit is configured to transmit, before the management of the transaction processing steps has begun, a lock request to the module so that other clients than said client are inhibited from using the function that needs exclusive access control.

10. An information-processing apparatus according to claim 7, wherein the transaction management unit is configured to transmit, after the management of the transaction processing steps has ended, an unlock request to the module so that inhibition of using the function by other clients than said client is canceled.

11. An information-processing apparatus according to claim 5, wherein the transaction management unit is configured to receive a lock type and a management start request from the client, the lock type indicating a classification of a lock request being sent to the module, and the transaction management unit is configured to transmit the lock request, indicated by the received lock type, to the module so that other clients than said client are inhibited from using the function that needs exclusive access control.

12. An information-processing apparatus according to claim 5, wherein the transaction management unit is configured to receive a lock type and a lock type change request from the client, the lock type indicating a classification of a lock request being sent to the module, and the transaction management unit is configured to transmit the lock request, indicated by the received lock type, to the module so that other clients than said client are inhibited from using the function that needs exclusive access control.

13. An information-processing apparatus according to claim 6, wherein the transaction management unit is configured to determine a classification of a lock request being sent to the module, in accordance with a kind of a function request received from the client, and the transaction management unit is configured to transmit the lock request, indicated by the determined classification, to the module so that other clients than said client are inhibited from using the function that needs exclusive access control.

14. An information-processing apparatus according to claim 6, wherein the transaction management unit transmits, before the management of the transaction processing steps is started, a lock request to the module so that other clients than said client are inhibited from using the function that needs exclusive access control.

15. An information-processing apparatus according to claim 8, wherein the transaction management unit is configured to transmit, after the management of the transaction processing steps has ended, an unlock request to the module so that inhibition of using the function by other clients than said client is canceled.

16. An information-processing method for an information-processing apparatus which provides one or more clients with a function that needs exclusive access control in which user information stored in the information-processing apparatus is exclusively read or updated by a client through authentication, the method comprising:
- a session management step of managing a series of session processing steps and incidental information;
- receiving a session start request and information to authenticate the one or more clients;
- creating session information including a session ID, a first time-out period, and authentication data, the first time-out period indicating how long the session management unit holds the session information;
- extending the first time-out period by an amount based on the function that needs exclusive access control if a session extension request including the session ID and a client ID is received during the first time-out period and deleting the session information and ending the session if the session extension request is not received during the first time-out period;
- a transaction management step of managing a series of indivisible transaction processing steps performed by using the function that needs exclusive access control in a state where the transaction processing is continued by extending a second time-out period, which indicates how long transaction information is stored, by an amount based on the function that needs exclusive access control, the transaction information including a transaction ID, the second time-out period, and the session ID,
- wherein the session management step starts the management of the session processing steps when an express management start request is received from the client or when an implicit request to start management of the session processing steps other than the express management start request is received.

17. An information-processing method for an information-processing apparatus which provides one or more clients with a function that needs exclusive access control in which user information stored in the information-processing apparatus is exclusively read or updated by a client through authentication, the method comprising:
- a session management step of managing a series of session processing steps and incidental information;
- receiving a session start request and information to authenticate the one or more clients;
- creating session information including a session ID, a first time-out period, and authentication data, the first time-out period indicating how long the session management unit holds the session information;
- extending the first time-out period by an amount based on the function that needs exclusive access control if a session extension request including the session ID and a client ID is received during the first time-out period and deleting the session information and ending the session if the session extension request is not received during the first time-out period;
- a transaction management step of managing a series of indivisible transaction processing steps performed by using the function that needs exclusive access control in a state where the transaction processing is continued by extending a second time-out period, which indicates how long the transaction information is stored, by an amount based on the function that needs exclusive access control, the transaction information including a transaction ID, the second time-out period, and the session ID,
- wherein the session management step starts the management of the session processing steps when an express management start request and an implicit request to start management of the session processing steps other than the express management start request are received from the client.

18. An information-processing method for an information-processing apparatus which provides one or more clients with a function that needs exclusive access control in which user information stored in the information-processing apparatus is exclusively read or updated by a client through authentication, the method comprising:
- a session management step of managing a series of session processing steps and incidental information;
- receiving a session start request and information to authenticate the one or more clients;
- creating session information including a session ID, a first time-out period, and authentication data, the first time-out period indicating how long the session management unit holds the session information;
- extending the first time-out period by an amount based on the function that needs exclusive access control if a session extension request including the session ID and a client ID is received during the first time-out period and deleting the session information and ending the session if the session extension request is not received during the first time-out period;
- a transaction management step of managing a series of indivisible transaction processing steps performed by using the function that needs exclusive access control in a state where the transaction processing is continued by extending a second time-out period, which indicates how long transaction information is stored, by an amount based on the function that needs exclusive access control, the transaction information including a transaction ID, the second time-out period, and the session ID,
- wherein the session management step ends the management of the session processing steps when a management end request is received from the client or when the first time-out period expires.

19. An information-processing method for an information-processing apparatus which provides one or more clients with a function that needs exclusive access control in which user information stored in the information-processing apparatus is exclusively read or updated by a client through authentication, the method comprising:
- a session management step of managing a series of session processing steps and incidental information;
- receiving a session start request and information to authenticate the one or more clients;
- creating session information including a session ID. a first time-out period, and authentication data, the first time-out period indicating how long the session management unit holds the session information;
- extending the first time-out period by an amount based on the function that needs exclusive access control if a session extension request including the session ID and a client ID is received during the first time-out period and deleting the session information and ending the session if the session extension request is not received during the first time-out period;

a transaction management step of managing a series of indivisible transaction processing steps performed by using the function that needs exclusive access control in a state where the transaction processing is continued by extending a second time-out period, which indicates how long transaction information is stored, by an amount based on the function that needs exclusive access control, the transaction information including a transaction ID the second time out period, and the session ID, wherein the session management step ends the management of the session processing steps when a management end request is received from the client and the first time-out period expires.

20. An information-processing method for an information-processing apparatus which provides one or more clients with a function that needs exclusive access control in which user information stored in the information-processing apparatus is exclusively read or updated by a client through authentication, the method comprising:

a session management step of managing a series of session processing steps and incidental information;

receiving a session start request and information to authenticate the one or more clients;

creating session information including a session ID, a first time-out period, and authentication data, the first time-out period indicating how long the session management unit holds the session information;

extending the first time-out period by an amount based on the function that needs exclusive access control if a session extension request including the session ID and a client ID is received during the first time-out period and deleting the session information and ending the session if the session extension request is not received during the first time-out period;

a transaction management step of managing a series of indivisible transaction processing steps performed by using the function that needs exclusive access control in a state where the transaction processing is continued by extending a second time-out period, which indicates how long transaction information is stored, by an amount based on the function that needs exclusive access control, the transaction information including a transaction ID, the second time-out period, and the session ID, wherein the transaction management step starts the management of the transaction processing steps when an express management start request is received from the client or when an implicit request to start management of the transaction processing steps other than the express management start request is received.

21. An information-processing method for an information-processing apparatus which provides one or more clients with a function that needs exclusive access control in which user information stored in the information-processing apparatus is exclusively read or updated by a client through authentication, the method comprising:

a session management step of managing a series of session processing steps and incidental information;

receiving a session start request and information to authenticate the one or more clients;

creating session information including a session ID, a first time-out period, and authentication data, the first time-out period indicating how long the session management unit holds the session information;

extending the first time-out period by an amount based on the function that needs exclusive access control if a session extension request including the session ID and a client ID is received during the first time-out period and deleting the session information and ending the session if the session extension request is not received during the first time-out period;

a transaction management step of managing a series of indivisible transaction processing steps performed by using the function that needs exclusive access control in a state where the transaction processing is continued by extending a second time-out period, which indicates how long transaction information is stored, by an amount based on the function that needs exclusive access control, the transaction information including a transaction ID, the second time-out period, and the session ID, wherein the transaction management step starts the management of the transaction processing steps when an express management start request and an implicit request to start management of the transaction processing steps other than the express management start request are received from the client.

22. An information-processing method for an information-processing apparatus which provides one or more clients with a function that needs exclusive access control in which user information stored in the information-processing apparatus is exclusively read or updated by a client through authentication, the method comprising:

a session management step of managing a series of session processing steps and incidental information;

receiving a session start request and information to authenticate the one or more clients;

creating session information including a session ID, a first time-out period, and authentication data, the first time-out period indicating how long the session management unit holds the session information;

extending the first time-out period by an amount based on the function that needs exclusive access control if a session extension request including the session ID and a client ID is received during the first time-out period and deleting the session information and ending the session if the session extension request is not received during the first time-out period;

a transaction management step of managing a series of indivisible transaction processing steps performed by using the function that needs exclusive access control in a state where the transaction processing is continued by extending a second time-out period, which indicates how long transaction information is stored, by an amount based on the function that needs exclusive access control, the transaction information including a transaction ID, the second time-out period, and the session ID, wherein the transaction management step ends the management of the transaction processing steps when a management end request is received from the client or when the second time-out period expires.

23. An information-processing method for an information-processing apparatus which provides one or more clients with a function that needs exclusive access control in which user information stored in the information-processing apparatus is exclusively read or updated by a client through authentication, the method comprising:

- a session management step of managing a series of session processing steps and incidental information;
- receiving a session start request and information to authenticate the one or more clients;
- creating session information including a session ID, a first time-out period, and authentication data, the first time-out period indicating how long the session management unit holds the session information;
- extending the first time-out period by an amount based on the function that needs exclusive access control if a session extension request including the session ID and a client ID is received during the first time-out period and deleting the session information and ending the session if the session extension request is not received during the first time-out period;
- a transaction management step of managing a series of indivisible transaction processing steps performed by using the function that needs exclusive access control in a state where the transaction processing is continued by extending a second time-out period, which indicates how long transaction information is stored, by an amount based on the function that needs exclusive access control, the transaction information including a transaction ID, the second time-out period, and the session ID,
- wherein the transaction management step ends the management of the transaction processing steps when a management end request is received from the client and the second time-out period expires.

* * * * *